United States Patent
Kim et al.

(10) Patent No.: US 9,535,523 B2
(45) Date of Patent: Jan. 3, 2017

(54) TOUCH SENSOR INTEGRATED TYPE DISPLAY DEVICE

(71) Applicant: LG Display Co., Ltd., Seoul (KR)

(72) Inventors: Cheolse Kim, Daegu (KR); Juhan Kim, Gyeonggi-do (KR); Hoonbae Kim, Gyeonggi-do (KR); Sungsu Han, Gyeonggi-do (KR); Jinseong Kim, Seoul (KR); Manhyeop Han, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/026,031

(22) Filed: Sep. 13, 2013

(65) Prior Publication Data
US 2014/0160066 A1 Jun. 12, 2014

(30) Foreign Application Priority Data

Dec. 11, 2012 (KR) .................. 10-2012-0143228

(51) Int. Cl.
*G06F 3/041* (2006.01)
*G02F 1/1333* (2006.01)
(Continued)

(52) U.S. Cl.
CPC ......... *G06F 3/0412* (2013.01); *G02F 1/13338* (2013.01); *G06F 3/044* (2013.01);
(Continued)

(58) Field of Classification Search
USPC ................................................ 345/173, 174
See application file for complete search history.

(56) References Cited

U.S. PATENT DOCUMENTS

2005/0030461 A1   2/2005   Ono et al.
2006/0139545 A1*  6/2006   Hong ........................... 349/141
(Continued)

FOREIGN PATENT DOCUMENTS

EP       2 431 846 A1    3/2012
JP       2010-008758 A   1/2010
(Continued)

OTHER PUBLICATIONS

Extended European Search Report dated Mar. 20, 2014 for European patent application No. 13182182.9.
(Continued)

*Primary Examiner* — Jason Olson
*Assistant Examiner* — Deeprose Subedi
(74) *Attorney, Agent, or Firm* — Morgan, Lewis & Bockius LLP

(57) ABSTRACT

A touch sensor integrated type display device includes a plurality of gate lines, a plurality of data lines crossing over the plurality of the gate lines, a plurality of pixel electrodes formed in areas defined by crossing over the gate lines and the data lines, a plurality of first electrodes formed between pixel electrodes which are neighbored to each other with a gate line therebetween, a plurality of second electrodes, each of the second electrodes formed to overlap with at least one portion of the pixel electrode and arranged in parallel with the gate line, wherein one of the first and second electrodes serve as common electrodes for driving the display device.

17 Claims, 24 Drawing Sheets

(51) Int. Cl.
*G06F 3/044* (2006.01)
*G02F 1/1343* (2006.01)
*G02F 1/1362* (2006.01)

(52) U.S. Cl.
CPC .............. *G02F 2001/13629* (2013.01); *G02F 2001/134372* (2013.01); *G06F 2203/04103* (2013.01)

(56) References Cited

U.S. PATENT DOCUMENTS

| | | | |
|---|---|---|---|
| 2009/0002312 A1 | 1/2009 | Son | |
| 2009/0323005 A1 | 12/2009 | Ota | |
| 2011/0157039 A1* | 6/2011 | Shin | G02F 1/13338 345/173 |
| 2011/0157504 A1 | 6/2011 | Kimura et al. | |
| 2012/0026131 A1* | 2/2012 | Bytheway | G06F 3/044 345/174 |
| 2012/0068944 A1 | 3/2012 | Oh et al. | |
| 2012/0249444 A1 | 10/2012 | Lee et al. | |
| 2013/0033439 A1 | 2/2013 | Kim et al. | |
| 2013/0342801 A1* | 12/2013 | Hamada | G06F 3/0412 349/141 |

FOREIGN PATENT DOCUMENTS

| | | | |
|---|---|---|---|
| JP | 2011-048394 A | 3/2011 | |
| JP | 2011-137882 A | 7/2011 | |
| KR | 20090000484 A | 1/2009 | |
| KR | 20120097765 A | 9/2012 | |
| KR | 20120111678 A | 10/2012 | |
| KR | 20130015582 A | 2/2013 | |
| WO | 20121118038 A1 | 9/2012 | |
| WO | WO 2012118038 A1 * | 9/2012 | G06F 3/0412 |

OTHER PUBLICATIONS

Japanese Office Action dated Jun. 19, 2014 for corresponding Japanese Patent Application No. 2013-179651.

* cited by examiner

TOUCH SENSOR INTEGRATED TYPE DISPLAY DEVICE

This application claims the benefit of priority under 35 U.S.C. §119(a) to Korean Patent Application No. 10-2012-0143228 filed on Dec. 11, 2012, the entire contents of which is incorporated by reference herein in its entirety.

BACKGROUND OF THE INVENTION

Field of the Invention

This disclosure relates to a touch sensor integrated type display device capable of perceiving touch of the display device, and a method of manufacturing the same.

Discussion of the Related Art

In recent years, various input devices such as a keyboard, a mouse, a joystick and a digitizer are used for constructing interfaces between users and home appliances or information telecommunication devices. However, when a user makes use of these input devices, user's dissatisfaction increases because the user is required to know how to use the input devices and the input devices occupy space. Therefore, a convenient and simple input device that can reduce erroneous operation is required. According to the requirement, there is proposed a touch sensor that can input information by directly contacting a screen with a user's finger or a pen.

The touch sensor has a simple configuration capable of reducing erroneous operations. The user can also perform an input action without using a separate input device, and can quickly and easily manipulate a device through contents displayed on a screen. Accordingly, the touch sensor has been applied to various display devices.

The touch sensor used in the display devices may be classified into an add-on type touch sensor, and an on-cell type touch sensor. The add-on type touch sensor is configured such that the display device and the add-on type touch sensor are individually manufactured and then the add-on type touch sensor is attached to an upper substrate of the display device. The on-cell type touch sensor is configured such that components constituting the on-cell type touch sensor are directly formed on the surface of an upper glass substrate of the display device.

There is a problem that a thickness of the display device increases because the add-on type touch sensor has the structure in which the add-on type touch sensor is mounted on the display device. Further, the visibility of the display device is reduced because of a reduction in a brightness of the display device due to the increased thickness.

On the other hand, the on-cell type touch sensor shares the glass substrate with the display device because the on-cell type touch sensor has the structure in which the on-cell type touch sensor is formed on the surface of the glass substrate of the display device. Therefore, a thickness of the display device using the on-cell type touch sensor is less than a thickness of the display device using the add-on type touch sensor. However, the entire thickness of the display device using the on-cell type touch sensor increases because of a touch driving electrode layer, a touch sensing electrode layer, and an insulating layer for insulating the touch driving electrode layer and the touch sensing electrode layer which constitute the on-cell type touch sensor. Further, the number of processes and the manufacturing cost in the on-cell type touch sensor increase.

Accordingly, there is a need for a touch sensor integrated type display device capable of solving the problems of the above-described kinds of touch sensors.

SUMMARY OF THE INVENTION

Embodiments of this disclosure provide a touch sensor integrated type display device capable of reducing its thickness and simplifying its manufacturing process by sharing a touch sensing element for recognizing a touch operation with a component of a display device, and a method of manufacturing the same.

Embodiments of this disclosure also provide a touch sensor integrated type display device capable of improving touch sensitivity by increasing mutual capacitance between touch driving electrodes and touch sensing electrodes, and a method of manufacturing the same.

In one aspect, there is a touch sensor integrated type display device comprising a plurality of gate lines; a plurality of data lines crossing over the plurality of the gate lines; a plurality of pixel electrodes formed in areas defined by crossing over the gate lines and the data lines; a plurality of first electrodes formed between pixel electrodes which are neighbored to each other with a gate line therebetween; a plurality of second electrodes, each of the second electrodes formed to overlap with at least one portion of the pixel electrode and arranged in parallel with the gate line, wherein one of the first and second electrodes serve as common electrodes for driving the display device.

In the touch sensor integrated type display device, the first plurality of electrodes are touch sensing electrodes, and the second plurality of electrodes are touch driving electrodes serving as common electrodes.

In the touch sensor integrated type display device, the first plurality of electrodes are touch driving electrodes, and the second plurality of electrodes are touch sensing electrodes serving as common electrodes.

The touch sensor integrated type display device further includes at least one first electrode resistance reducing wire formed on the each of the first electrodes, thereby reducing resistance of the first electrode.

The touch sensor integrated type display device further includes a gate insulation layer between the gate lines and the data lines to cover the gate lines; a plurality of thin film transistors formed in pixel areas defined by crossings of the gate lines and the data lines; a first passivation layer covering the gate insulation layer on which the thin film transistors are formed; a second passivation layer covering the first electrodes which are formed on the first passivation layer to be in parallel with the data lines and formed in at least two pixel area neighbored to each other with a gate line therebetween; and a plurality of pixel electrodes formed on the second passivation layer in the pixel areas, respectively, each of the pixel electrodes being overlap with the at least one portion of the first electrode; and wherein the second electrodes are formed on the second passivation layer between the pixel electrodes which are neighbored to each other with the gate line therebetween, and formed in parallel with the gate line, and wherein one of the first and second electrodes serve as common electrodes for driving the display device.

In the touch sensor integrated type display device, the first plurality of electrodes are touch driving electrodes serving as common electrodes, and the second plurality of electrodes are touch sensing electrodes.

In the touch sensor integrated type display device, the first plurality of electrodes are touch sensing electrodes serving as common electrodes, and the second plurality of electrodes are touch driving electrodes.

The touch sensor integrated type display device of claim 5 further includes at least one second electrode resistance reducing wire formed on the each of the second electrodes, thereby reducing resistance of the second electrode.

The touch sensor integrated type display device includes a gate insulation layer between the data lines to cover the gate lines; a plurality of thin film transistors formed in pixel areas defined by crossings of the gate lines and the data lines, respectively; a first passivation layer covering the gate insulation layer on which the thin film transistors are formed; a plurality of pixel electrodes formed on the first passivation layer in the pixel areas, respectively; and a second passivation layer covering the plurality of first electrodes which are formed on the first passivation layer to be in parallel with the gate lines between the pixel electrodes neighbored to each other with a gate line therebetween, wherein the plurality of second electrodes are formed on the second passivation layer in at least two pixel areas with a gate line therebetween, a portion of each second electrode being overlapped with the pixel electrode to be in parallel with the data line, and wherein one of the first and second electrodes serve as common electrodes for driving the display device.

In the touch sensor integrated type display device, the first plurality of electrodes are touch sensing electrodes, and the second plurality of electrodes are touch driving electrodes serving as common electrodes.

In the touch sensor integrated type display device, the first plurality of electrodes are touch driving electrodes, and the second plurality of electrodes are touch sensing electrodes serving as common electrodes.

The touch sensor integrated type display device further includes at least one first electrode resistance reducing wire formed on the each of the first electrodes, thereby reducing resistance of the first electrode.

In another aspect, there is a method of manufacturing a touch sensor integrated type display device comprising depositing a first conductive layer on a substrate, and then forming a plurality of gate lines and gate electrodes using a first mask process; sequentially forming a gate insulating layer and a semiconductor layer on the substrate on which the gate lines and gate electrodes are formed, and then forming semiconductor patterns opposite to the gate electrodes by patterning the semiconductor layer using a second mask process; depositing a second conductive layer on the gate insulation layer on which the semiconductor patterns are formed, and then forming a first conductive pattern group including a plurality of data lines in parallel with each other, source electrodes extended from the data lines, and drain electrodes opposite to the source electrodes by patterning the second conductive layer using a third mask process; sequentially forming a first passivation layer and a third conductive layer on the gate insulation layer on which the first conductive pattern group are formed, and then forming a plurality of first electrodes by patterning the third conductive layer using a fourth mask process; depositing a fourth conductive layer on the first passivation layer on which the first electrodes are formed, and then forming at least one first electrode resistance reducing wire connected to each of the first electrodes by patterning the fourth conductive layer using a fifth mask process; forming a second passivation layer on the first passivation layer on which the first electrodes and the first electrode resistance reducing wires are formed, and then forming a contact hole exposing a portion of each the drain electrodes by patterning the first and second passivation layers using a sixth mask process; depositing a fifth conductive layer on the second passivation layer with the contact hole, and then forming second electrode resistance reducing wires in parallel with the gate line by patterning the fifth conductive layer using a seventh mask process; and depositing a sixth conductive layer on the second passivation layer on which the second electrode resistance reducing wires are formed, and then forming a plurality of pixel electrodes and a plurality of second electrodes by patterning the sixth conductive layer using the eighth mask process, wherein one of the first and second electrodes serve as common electrodes for driving the display device.

In the method, the first electrodes are formed in parallel with the data lines, and formed in at least two pixel areas of pixel areas with the gate line therebetween, and defined by crossings of the gate lines and the data lines and have the gate line therebetween, the plurality of first electrode resistance reducing wires are overlapped with the plurality of first electrodes, respectively, thereby reducing resistance of the first electrode, the plurality of pixel electrodes are formed in the pixel areas; the plurality of electrodes formed in parallel with each other on the second passivation layer between the pixel electrodes which are neighbored to each other with the gate line therebetween, and the at least one second electrode resistance reducing wire is formed on each of the plurality of second electrodes, thereby reducing resistance of the second electrode.

In another aspect, there is a method of manufacturing a touch sensor integrated type display device comprising: depositing a first conductive layer on a substrate and then forming a plurality of gate lines and gate electrodes using a first mask process; sequentially forming a gate insulating layer and a semiconductor layer on the substrate on which the gate lines and gate electrodes are formed, and then forming semiconductor patterns opposite to the gate electrodes by patterning the semiconductor layer using a second mask process; depositing a second conductive layer on the gate insulation layer on which the semiconductor patterns are formed, and then forming a first conductive pattern group including a plurality of data lines in parallel with each other, source electrodes extended from the data lines, and drain electrodes opposite to the source electrodes by patterning the second conductive layer using a third mask process; forming a first passivation layer on the gate insulation layer on which the first conductive pattern group are formed, and then forming a plurality of contact holes exposing a portion of each the drain electrodes by etching the first passivation layer using a fourth mask process; depositing a third conductive layer on the first passivation layer with the contact holes, and then forming a plurality of first electrodes and a plurality of pixel electrodes connected to the drain electrodes exposed through the contact holes by patterning the third conductive layer using a fifth mask process; forming a fourth conductive layer on the first passivation layer on which the first electrodes and the pixel electrodes are formed, and then forming at least one first electrode resistance reducing wire by patterning the fourth conductive layer using a sixth mask process, the at least one first electrode resistance reducing wire being formed on each of the first electrodes to reduce resistance of the first electrode; sequentially forming a second passivation layer and a fifth conductive layer on the first passivation on which the first electrodes and the first electrode resistance reducing wires are formed, and then forming at least one second electrode resistance reducing wire in parallel with the data line by patterning the fifth conductive layer using a seventh mask process; and forming a sixth conductive layer on the second passivation layer on which the second electrode resistance reducing wires are formed, and then forming a plurality of a plurality of second electrodes by patterning the sixth conductive layer using the eighth mask process, each of the plurality of a plurality of second electrodes being connected to the at least one second electrode resistance reducing wire, wherein one of the first and second electrodes serve as common electrodes for driving the display device.

In the method, the pixel electrodes are formed in areas defined by crossing of the gate lines and the data lines, the first electrode is formed in parallel with the gate line between the pixel electrodes which are neighbored to each other with the gate line therebetween, the at least one first electrode resistance reducing wire is formed be in overlapped with each of the first electrodes, thereby reducing resistance of the first electrode, the second electrode is formed in at least two pixel area with the gate line therebetween so that at least one portion thereof is overlapped with the pixel, and in parallel with the data line, and the at least one first electrode resistance reducing wire is formed be in overlapped with each of the second electrodes, thereby reducing resistance of the second electrode.

According to the touch sensor integrated type display devices and methods of manufacturing the same, it is possible to remove the process for forming the independent touch sensing electrodes (or touch driving electrodes), thereby lessening a thickness of the display device by as much as the thickness of the touch sensing electrode because the common electrode for driving the display device can serve as touch sensing electrodes (or touch driving electrodes).

Furthermore, one touch sensing electrode (or one touch driving electrode) and one pixel electrode may be formed in one to one, otherwise one to n (wherein, n is two or more natural number). Also, the touch sensing and driving electrodes may be easily grouped using the sensing and driving electrode resistance reducing wires. Accordingly, it is possible to easily adjust a size of touch recognition block according to need, and improve touch sensitivity by increasing mutual capacitance between the touch driving electrodes and touch sensing electrodes because number of the touch driving electrodes and touch sensing electrodes are increased.

BRIEF DESCRIPTION OF THE DRAWINGS

The teachings of the embodiments can be readily understood by considering the following detailed description in conjunction with the accompanying drawings.

DETAILED DESCRIPTION OF THE EMBODIMENTS

Figure 1:
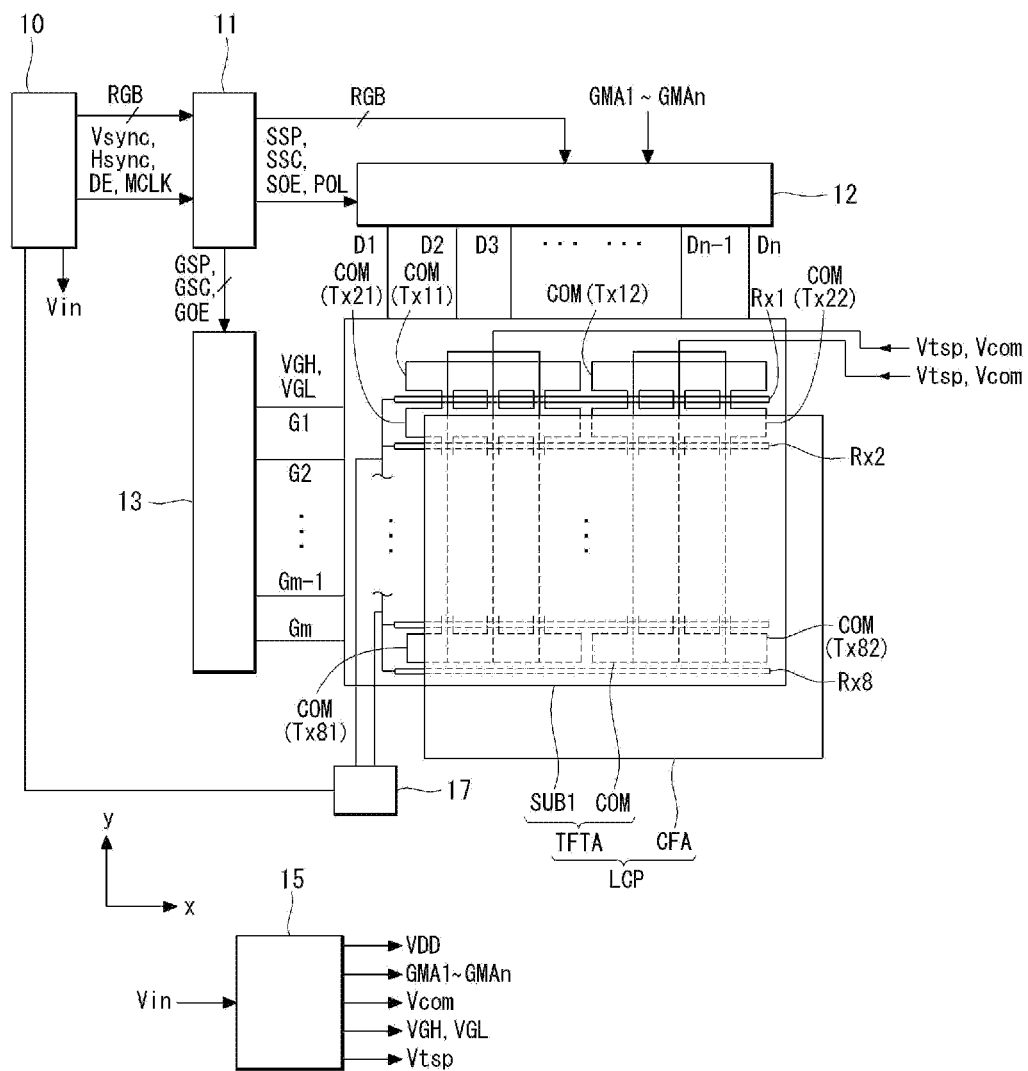
FIG. 1 is a block diagram schematically illustrating a touch sensor integrated type display device according to one embodiment of this disclosure.

Hereinafter, exemplary embodiments of this disclosure will be described in detail with reference to the accompanying drawings, wherein same reference numerals may be used to denote the same or substantially the same elements throughout the specification and the drawings.

A touch sensor integrated type display device according to one embodiment of this disclosure is described in detail with reference to FIGS. 1 to 3. FIG. 1 is a block diagram schematically illustrating a touch sensor integrated type display device according to one embodiment of this disclosure, FIG. 2 is a partial exploded perspective view schematically showing the display device shown in FIG. 1, and FIG. 3 is a block diagram schematically illustrating a relationship between touch driving electrodes and touch sensing electrodes of a touch sensor integrated type display device according to one embodiment of this disclosure.

In the following description, a touch sensor integrated type liquid crystal display device is used as an example of the touch sensor integrated type display device.

Figure 2:
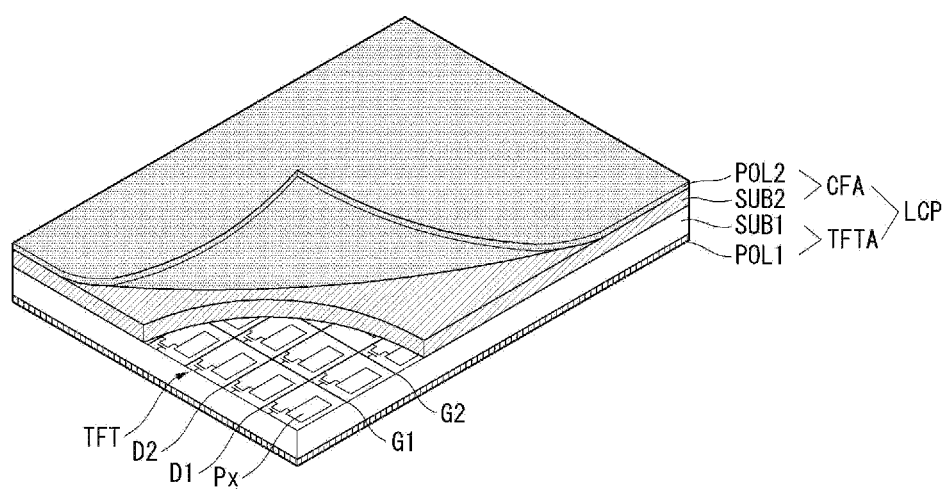
FIG. 2 is a partial exploded perspective view schematically showing the display device shown in FIG. 1.
Figure 3:
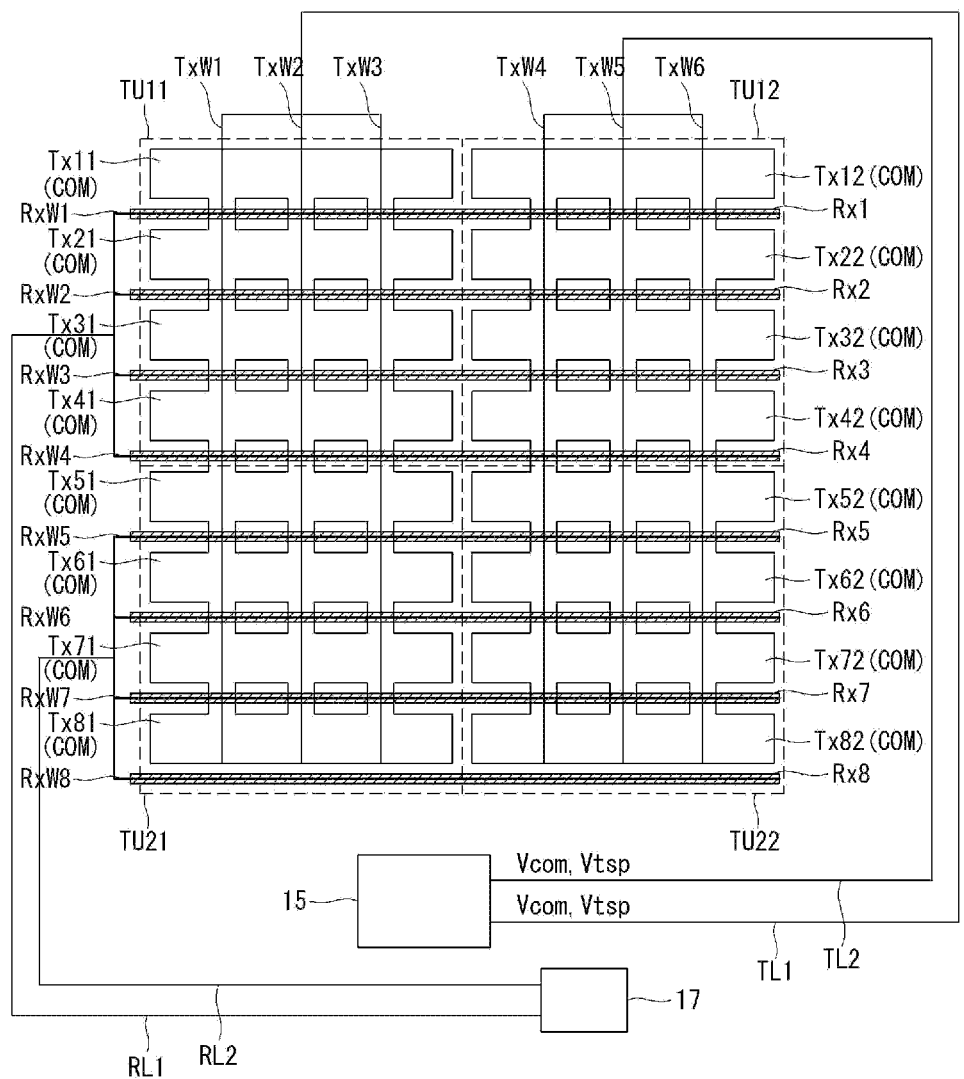
FIG. 3 is a block diagram schematically illustrating a relationship between touch driving electrodes and touch sensing electrodes of a touch sensor integrated type display device according to one embodiment of this disclosure.

Referring to FIGS. 1 and 2, the touch sensor integrated type liquid crystal display according to one embodiment of this disclosure includes a liquid crystal display panel LCP, a host controller 10, a timing controller 11, a data driver 12, a gate driver 13, a power supply unit 15, and a touch recognition processor 17.

The liquid crystal display panel LCP includes a color filter array CFA and a thin film transistor (TFT) array TFTA with a liquid crystal layer interposed therebetween.

The TFT array TFTA includes a plurality of gate lines G1, G2, G3, . . . , Gm−1, and Gm, which are formed parallel to one another on a first substrate SUBS1 in a first direction (for example, x-axis direction), a plurality of data lines D1, D2, D3, . . . , Dn−1, and Dn, which are formed parallel to one another in a second direction (for example, y-axis direction) to cross over the plurality of gate lines G1, G2, G3, . . . , Gm−1, and Gm, TFTs respectively formed at crossings of the gate lines G1, G2, G3, . . . , Gm−1, and Gm and the data lines D1, D2, D3, . . . Dn−1, and Dn, a plurality of pixel electrodes Px for charging a data voltage in liquid crystal cells, and common electrodes COM positioned to be opposite to the plurality of pixel electrodes Px.

The color filter array CFA includes black matrixes and color filters, which are formed on a second substrate SUBS2. Polarizing plates POL1 and POL2 are respectively attached to outer surfaces of the first substrate SUBS1 and the second substrate SUBS2 of the liquid crystal display panel LCP. Alignment layers (not shown) for setting a pre-tilt angle of liquid crystals are respectively formed on inner surfaces of the first substrate SUBS1 and the second substrate SUBS2 contacting the liquid crystals. A column spacer may be formed between the first substrate SUBS 1 and the second substrate SUBS2 to maintain cell gaps of the liquid crystal cells.

A backlight unit (not shown) is disposed under the TFT array TFTA. The backlight unit includes a plurality of light sources to uniformly irradiate light onto the TFT array TFTA and the color filter array CFA. The backlight unit may be implemented as one of an edge type backlight unit and a direct type backlight unit. The light sources of the backlight unit may include one or at least two of a hot cathode fluorescent lamp (HCFL), a cold cathode fluorescent lamp (CCFL), an external electrode fluorescent lamp (EEFL), and a light emitting diode (LED).

The common electrode COM is formed on the second substrate SUBS2 in a vertical electric field driving manner such as a twisted nematic (TN) mode and a vertical alignment (VA) mode. Further, the common electrode COM is formed on the first substrate SUBS1 along with the pixel electrodes Px in a horizontal electric field driving manner such as an in-plane switching (IPS) mode and a fringe field switching (FFS) mode. In this disclosure, common electrode COM in the horizontal electric field driving manner is described as an example.

FIG. 3 is a top planar view schematically illustrating a relationship between touch driving electrodes and touch sensing electrodes (which serve as common electrodes) of the touch sensor integrated type display device according to one embodiment of this disclosure.

Referring to FIG. 3, the common electrode COM according to one embodiment of this disclosure is a plurality of electrodes divided into a first direction (for example, x axis direction) but connected to each other in a second direction (for example, y axis direction) crossing the first direction. The plurality of electrodes constituting the common electrode COM serve as a plurality of touch driving electrodes Tx11, Tx21, Tx31, . . . Tx81; and Tx12, Tx22, Tx32, . . . Tx82.

Among the plurality of touch driving electrodes Tx11, Tx21, Tx31, ... Tx81; and Tx12, Tx22, Tx32, ... Tx82, a first touch driving electrodes Tx11, Tx21, Tx31, ... Tx81 arranged in the second direction are connected to each other by at least one connection portion. And then a first resistance reducing wires TxW1, TxW2 and TxW3 are formed on the first touch driving electrodes Tx11, Tx21, Tx31, ... and Tx81 to reduce resistance thereof. A second touch driving electrodes Tx12, Tx22, Tx32, ... Tx82 arranged in the second direction are connected to each other by at least one connection portion. And then a second resistance reducing wires TxW4, TxW5 and TxW6 are formed on the second touch driving electrodes Tx12, Tx22, Tx32, ... and Tx82 to reduce resistance thereof. The first and second resistance reducing wires TxW1 to TxW3 and TxW4 to TxW6 are connected to the power supply unit 15 via the first routing wires TL1 and TL2, respectively.

The embodiment shown in FIG. 3 illustrates an example in which the touch driving electrodes consists of two touch driving lines. That is, the embodiment of FIG. 3 illustrates an example in which one touch driving line is constituted by the first touch driving electrodes Tx11, Tx21, ... and Tx81 and the first resistance reducing wires TxW1, TxW2 and TxW3, and another touch driving line is constituted by the second touch driving electrodes Tx12, Tx22, ... and Tx82 and the second resistance reducing wires TxW4, TxW5 and TxW6.

In a touch operation, a touch driving voltage Vtsp is supplied to the first and second touch driving electrodes Tx11, Tx21, Tx31, ... and Tx81; and Tx12, Tx22, Tx32, ... and Tx82 from the power supply unit 15. And then in a display operation, a common voltage Vcom is supplied to the first and second touch driving electrodes Tx11, Tx21, Tx31, ... and Tx81; and Tx12, Tx22, Tx32, ... and Tx82 from the power supply unit 15.

In the embodiment shown in FIG. 3, three the first resistance reducing wires TxW1, TxW2 and TxW3 are used to constitute the first touch driving line and three the second resistance reducing wires TxW4, TxW5 and TxW6 are used to constitute the second touch driving line. However, this disclosure is not limited thereto. For example, one or two resistance reducing wires may be used to constitute each of the first and second touch driving lines. Otherwise four and more resistance reducing wires may be used to constitute each of the first and second touch driving lines.

On the other hand, touch sensing electrodes Rx1 to Rx8 constituting the touch sensor according to one embodiment of this disclosure are arranged in the first direction (for example, x axis direction) to cross over the first and second resistance reducing wires TxW1 to TxW3 and TxW4 to TxW6 between the first and second touch driving electrodes Tx11, Tx12 and Tx21, Tx22; Tx21, Tx22 and Tx31, Tx32; Tx31, Tx32 and Tx41, Tx42; Tx41, Tx42 and Tx51, Tx52; Tx51, Tx52 and Tx61, Tx62; Tx61, Tx62 and Tx71, Tx72; and Tx71, Tx72 and Tx81, Tx82. Another resistance reducing wires RxW1, RxW2, ... and RxW8 are formed on the touch sensing electrodes Rx1 to Rx8, respectively. Also, the touch sensing electrodes Rx1 to Rx8 are separated from each other, but they may be grouped by the resistance reducing wires RxW1 to RxW8. For example, the first to fourth touch sensing electrodes Rx1 to Rx4 are grouped by the third to sixth resistance reducing wires RxW1 to RxW4, and the fifth to eighth touch sensing electrodes Rx5 to Rx8 are grouped by the seventh to tenth resistance reducing wires RxW5 to RxW8. Accordingly, the first to eighth touch sensing electrodes Rx1 to Rx8 are grouped by the third to tenth resistance reducing wires RxW1 to RxW8 to form two touch sensing lines including a first touch sensing line Rx1 to Rx4 and RxW1 to RxW4, and a second touch sensing line Rx5 to Rx8 and RxW5 and RxW8. The first sensing line Rx1 to Rx4 and RxW1 to RxW4 is connected to the touch recognition processor 17 via the second routing wire RL1, and the second sensing line Rx5 to Rx8 and RxW5 to RxW8 is connected to the touch recognition processor 17 via the second routing wire RL2.

The touch recognition processor 17 measures difference of mutual capacitance before and after a touch whenever the touch is performed, thereby capable of detecting the touch position because the touch sensing electrodes Rx1 to Rx8 are connected to the touch recognition processor 17.

The touch sensor according to one embodiment of this disclosure includes the touch driving electrodes Tx11, Tx21, ..., and Tx81; and Tx12, Tx22, ... and Tx82, and the touch sensing electrodes Rx1 to Rx8. And an unit of touch recognition block may be determined by appropriately grouping the touch driving electrodes Tx11, Tx21, ..., and Tx81; and Tx12, Tx22, ... and Tx82 and the touch sensing electrodes Rx1 to Rx8 using the first to eighth resistance reducing wires RxW1 to RxW8. In example shown in FIG. 3, four touch recognition block TU11, TU12, TU21 and TU22 are formed by eight touch sensing electrodes Rx1 to Rx8, sixteen touch driving electrodes Tx11, Tx12, Tx21, Tx22, ... Tx81 and Tx82, and fourteen resistance reducing wires TxW1 to TxW6 and RxW1 to RxW8.

More specifically, a first touch recognition block TU11 is determined by the first touch driving electrodes Tx11, Tx21, Tx31 and Tx41 connected to each other by the resistance reducing wires TxW1 to TxW3, and the first to fourth touch sensing electrodes Rx1 to Rx4 connected to each other by the resistance reducing wires RxW1 to RxW4. A second touch recognition block TU12 is determined by the second touch driving electrodes Tx12, Tx22, Tx32 and Tx42 connected to each other by the resistance reducing wires TxW4 to TxW6, and the first to fourth touch sensing electrodes Rx1 to Rx4 connected to each other by the resistance reducing wires RxW1 to RxW4. A third touch recognition block TU21 is determined by the first touch driving electrodes Tx51, Tx61, Tx71 and Tx81 connected to each other by the resistance reducing wires TxW1 to TxW3, and the fifth to eighth touch sensing electrodes Rx5 to Rx8 connected to each other by the resistance reducing wires RxW5 to RxW8. A fourth touch recognition block TU22 is determined by the second touch driving electrodes Tx52, Tx62, Tx72 and Tx82 connected to each other by the resistance reducing wires TxW4 to TxW6, and the fifth to eighth touch sensing electrodes Rx5 to Rx8 connected to each other by the resistance reducing wires RxW5 to RxW8.

The mentioned above touch driving electrodes Tx11, Tx12, Tx21, Tx22, ... Tx81 and Tx82 serve as common electrodes COM, and formed on the first substrate SUB1 along with the pixel electrodes Px in a horizontal electrical field driving type display device. And the pixel electrodes Px are formed in areas defined by the crossing of the gate lines G1 to Gm and the data lines D1 to Dn as shown in FIG. 2.

Each of the touch driving electrodes Tx11, Tx12, Tx21, Tx22, ... Tx81 and Tx82 are formed be in opposite to several to several tens of the pixel electrodes Px, but may be formed be in opposite to one pixel electrode Px.

In the mentioned above touch sensor integrated type display device, one touch driving electrode and one pixel electrode may be formed in relation with one to one, otherwise one to n (wherein, n is two or more natural number). Also, each of the first and second resistance reducing wires TxW1 to TxW3 and TxW4 to TxW6 may be formed to be corresponding to one data line, otherwise several to several tens of the data lines. Also, each of the touch sensing electrodes Rx1 to Rx8 may be formed to be corresponding to one gate line, otherwise several to several tens of the gate lines. According to the construction, it is possible to improve touch sensitivity by increasing mutual capacitance between the touch driving electrodes and touch sensing electrodes because number of the touch driving electrodes and touch sensing electrodes are increased. Furthermore, it is possible to easily adjust number of the touch driving electrodes and touch sensing electrodes according to need because the touch driving electrodes and the touch sensing electrodes may be formed to be corresponding to the gate lines and data lines.

The touch sensor integrated type display device according to one embodiment of this disclosure will be described in detail with reference to FIGS. 4A and 4B.

Figure 4A:
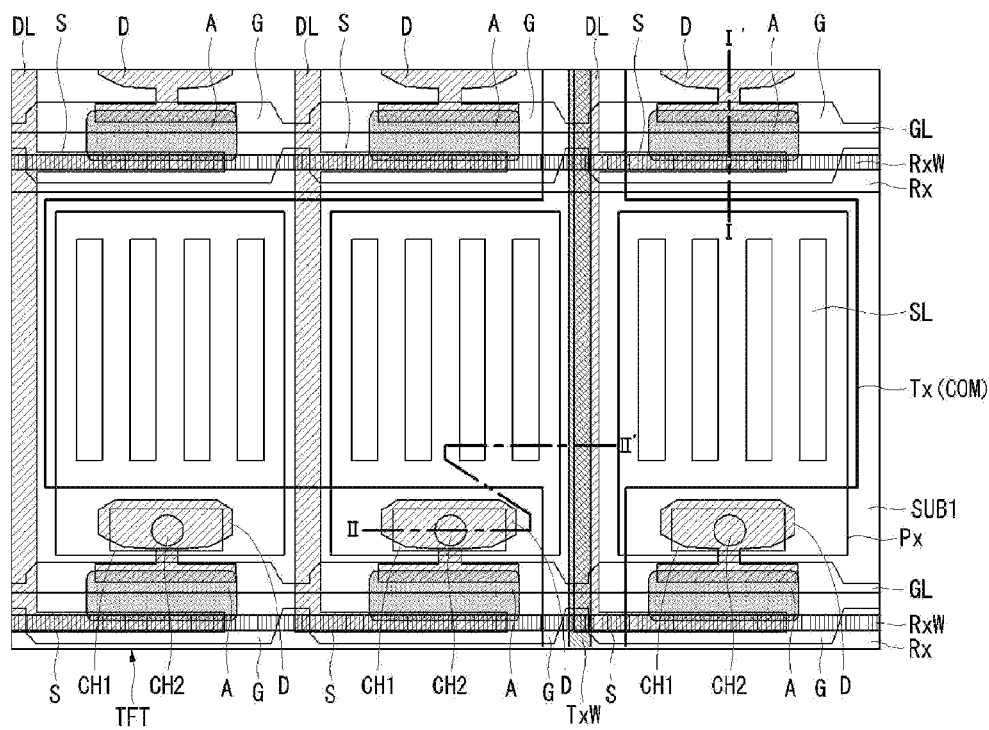
FIG. 4A is a top planar view illustrating a portion of a touch sensor integrated type display device according to one embodiment of this disclosure.
Figure 4B:
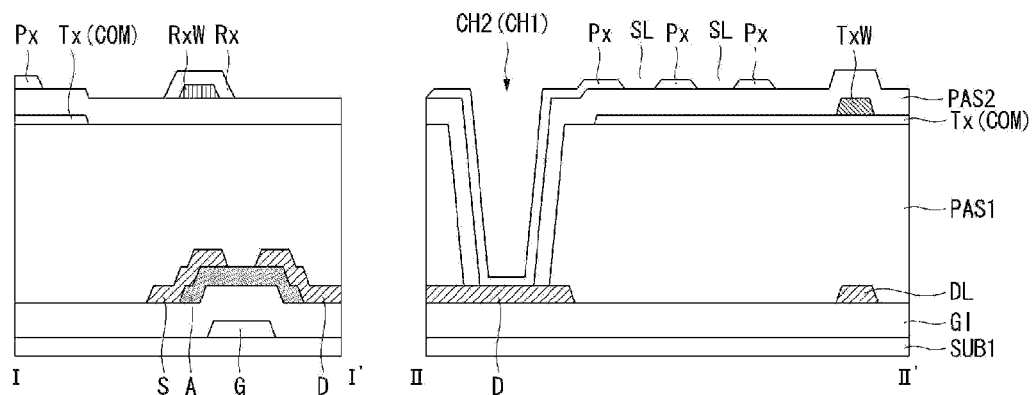
FIG. 4B is a cross-sectional view taken along lines I-I' and II-II' of FIG. 4A.

Referring to FIGS. 4A and 4B, the touch sensor integrated type display device according to one embodiment of this disclosure includes gate lines GL and data lines DL formed on substrate SUB 1 of a thin film transistor array TFTA to cross over to each other, thin film transistors TFTs respectively formed at crossings of the gate lines GL and the data lines DL, pixel electrodes Px formed in areas which are defined by crossings of the gate lines GL and the data lines DL, and a common electrode COM positioned to be opposite to the pixel electrodes Px. The common electrode COM serves as a touch driving electrode Tx. Accordingly, it is referred to as a common electrode COM, a touch driving electrode Tx, or a touch common electrodes COM which serves as a touch driving electrode Tx according to need.

In the construction, the thin film transistors TFTs may include a gate electrode G extended from the gate line GL, an active layer A formed on a gate insulation layer GI covering the gate line GL and the gate electrode G so as to overlap with the gate electrode G, a source electrode S extended from the data line D1 which is formed on a first passivation layer PAS1 covering the active layer A, and a drain electrode opposite to the source electrode S.

The common electrode COM which serves as the touch driving electrode Tx is formed on the first passivation layer PAS1 covering the thin film transistor TFT and the data line DL. In an example shown in FIGS. 4A and 4B, one touch driving common Tx is formed to be corresponding to three pixel electrodes Px, but this disclosure is not limited thereto. For example, the touch driving electrode Tx and the pixel electrode Tx are formed in one-to-one, or one-to-n (wherein "n" is natural number) correspondence.

First and second resistance reducing wires (hereinafter referred to as "driving electrode resistance reducing wire") TxW (TxW1 to TxW3 and TxW4 to TxW6 of FIG. 3) are formed on the first and second touch driving electrodes Tx (Tx11, TX21, . . . Tx81; and Tx12, Tx22, . . . Tx82 of FIG. 3), respectively, to reduce the resistance of the first and second touch driving electrodes Tx (Tx11, TX21, . . . Tx81; and Tx12, Tx22, . . . Tx82 of FIG. 3).

A second passivation layer PAS2 is formed on the first passivation layer PAS1 on which the driving electrode resistance reducing wire TxW and the touch driving electrode Tx are formed. A first and second contact holes CH1 and CH2 passing through the first and second passivation layer PAS1 and PAS2 are formed to expose a portion of the drain electrode D.

Third and fourth resistance reducing wires (hereinafter referred to as "driving electrode resistance reducing wire") RxW (RxW1 to RxW4 and RxW5 to RxW8 of FIG. 3) are formed in parallel with the gate line GL (that is, in x axis direction) on the second passivation PAS2 in which the first and second contact holes CH1 and CH2 are formed. Pixel electrodes Tx are formed on the second passivation layer PAS2 in pixel areas defined by the crossing of the gate lines GL and the data lines DL. Touch sensing electrodes Rx (Rx1 to Rx8 of FIG. 3) are formed on the second passivation layer PAS2 in parallel with the gate line GL to cover the sensing electrode resistance reducing wires RxW between the pixel electrodes Px which are neighbored to each other in up and down in the drawings. The example of FIG. 4A shows that the touch sensing electrode Rx is overlapped with a portion of the gate electrode G and the source electrode S, but that the touch sensing electrode Rx may be overlapped with all of the source electrode S and a portion of the drain electrode S.

In the touch sensor integrated type display device according to one embodiment of this disclosure, the touch driving electrode Tx formed on the first passivation layer PAS1 has no slit or openings, and the pixel electrode Tx has slits or openings SL as shown in FIGS. 4A and 4B. However this disclosure is no limited thereto. For example, if one of the touch driving electrode Tx and touch sensing electrode Rx has slits or openings, the other of the touch driving electrode Tx and touch sensing electrode Rx has no slits or openings.

In the touch sensor integrated type display device according to one embodiment of this disclosure, there is described that the common electrode COM serves as the touch driving electrode Tx. However the common electrode COM may serve as the touch sensing electrode Rx if the common voltage Vcom is supplied to the touch common electrode Tx from the power supply unit 15 in a display driving operation, a touch driving voltage Vtsp is supply to the touch sensing electrode Rx from the power supply unit 15 in a touch driving operation, and the common electrode COM is connected to the touch recognition processor 17 during the touch driving operation.

Again, referring to FIGS. 1 and 2, the gate driver 13 sequentially outputs a gate pulse (or a scan pulse) under the control of the timing controller 11 during a display driving operation. The gate driver 13 shifts a swing voltage of the gate pulse to a gate high voltage VGH and a gate low voltage VGL. The gate pulse output from the gate driver 13 is synchronized with the data voltage output from the data driver 12 and is sequentially supplied to the gate lines G1 to Gm. The gate high voltage VGH is equal to or greater than a threshold voltage of the thin film transistor TFT, and the gate low voltage VGL is less than the threshold voltage of the thin film transistor TFT. A plurality of gate driving integrated circuits (ICs) of the gate driver 13 may be connected to the gate lines G1 to Gm formed on the first substrate SUBS1 of the TFT array TFTA through a tape automated bonding (TAB) process. Alternatively, the gate driving ICs of the gate driver 13 may be directly formed on the first substrate SUBS1 of the TFT array TFTA along with pixels through a gate-in-panel (GIP) process.

The data driver 12 samples and latches digital video data RGB under the control of the timing controller 11. The data driver 12 converts the digital video data RGB into positive and negative gamma compensation voltages GMA1 to GMAn and inverts a polarity of the data voltage. The positive and negative data voltages output from the data driver 12 are synchronized with the gate pulses output from the gate driver 13. A plurality of source driving ICs of the data driver 12 may be connected to the data lines D1 to Dn formed on the first substrate SUBS1 of the TFT array TFTA through a chip-on glass (COG) process or the TAB process. The source driving ICs may be integrated inside the timing controller 11 and thus may be implemented as a single chip IC along with the timing controller 11.

The timing controller 11 generates timing control signals for controlling operation timings of the gate driver 13 and the data driver 12 using timing signals Vsync, Hsync, DE, and MCLK, which are received from the external host controller 10 and are used to drive the touch sensor integrated type liquid crystal display. The timing control signals include a gate timing control signal for controlling the operation timing of the gate driver 13 and a data timing control signal for controlling the operation timing of the data driver 12 and the polarity of the data voltage.

The gate timing control signal includes a gate start pulse GSP, a gate shift clock GSC, a gate output enable GOE, and the like. The gate start pulse GSP is applied to a first gate driving IC of the gate driver 13 to output a first gate pulse in each frame period and controls a shift start timing of the first gate driving IC. The gate shift clock GSC is commonly input to the gate driving ICs of the gate driver 13 and also shifts the gate start pulse GSP. The gate output enable GOE controls output timings of the gate driving ICs of the gate driver 13.

The data timing control signal includes a source start pulse SSP, a source sampling clock SSC, a polarity control signal POL, a source output enable SOE, and the like. The source start pulse SSP is applied to a first source driving IC of the data driver 12 to firstly sample the data and controls a data sampling start timing. The source sampling clock SSC controls a sampling timing of data inside the source driving ICs based on a rising or falling edge thereof. The polarity control signal POL controls the polarity of the data voltage output from the source driving ICs. The source output enable SOE controls output timings of the source driving ICs. If the digital video data RGB is input to the data driver 102 through a mini low voltage differential signaling (LVDS) interface, the source start pulse SSP and the source sampling clock SSC may be omitted.

The power supply unit 15 is implemented as a DC-DC converter including a pulse width modulation (PWM) circuit, a boost converter, a regulator, a charge pump, a voltage divider, an operational amplifier, etc. The power supply unit 15 regulates a voltage input from the host controller 10 and generates voltages required to drive the liquid crystal display panel LCP, the data driver 12, the gate driver 13, the timing controller 11, and the backlight unit (not shown).

The voltages generated by the power supply unit 15 include a high potential power voltage VDD, the gate high voltage VGH, the gate low voltage VGL, a common voltage Vcom, positive and negative gamma reference voltages GMA1 to GMAn, a touch driving voltage Vtsp, and the like. The common voltage Vcom is supplied to the common electrodes COM under the control of the host controller 10 during a display driving operation. Alternatively, the common voltage Vcom may be supplied to the common electrode COM under the control of the timing controller 11 during a display driving operation. The touch driving voltage Vtsp is supplied to the touch driving electrodes Tx11, Tx21, . . . Tx81; and Tx12, Tx22, . . . Tx82 under the control of the host controller 10 during a touch driving operation. Alternatively, the touch driving voltage Vtsp may be supplied to the touch driving electrodes Tx11, Tx21, . . . Tx81; and Tx12, Tx22, . . . Tx82 under the control of the timing controller 11 during a touch driving operation.

In the embodiment shown in FIG. 1, the touch driving voltage Vtsp is supplied to the touch driving electrodes Tx11, Tx21, . . . Tx81; and Tx12, Tx22, . . . Tx82 through the power supply unit 15, but this disclosure is not limited thereto. For example, the touch driving voltage Vtsp is supply to the touch driving electrodes Tx11, Tx21, . . . Tx81; and Tx12, Tx22, . . . Tx82 through the touch recognition processor 17 under the control of the host controller 10 or the timing controller 11.

The host controller 10 transfers the digital video data RGB of an input image and the timing signals Vsync, Hsync, DE, and MCLK driving the touch sensor integrated type liquid crystal display to the timing controller 11 through an interface, such as the LVDS interface and a transition minimized differential signaling (TMDS) interface. When the touch sensor integrated type liquid crystal display is driven so as to display the image on its screen, the host controller 10 supplies control signal Vin for controlling the power supply unit 15, so that the common voltage Vcom can be supplied to the common electrode COM. When the touch sensor integrated type liquid crystal display is driven for the touch recognition, the host controller 10 supplies a control signal Vin for controlling the power supply unit 15, so that the touch driving voltage Vtsp can be supplied to the touch driving electrodes Tx11, Tx21, . . . Tx81; and Tx12, Tx22, . . . Tx82.

The touch recognition processor 17 differentially amplifies a difference voltage between a voltage of an initial capacitance of each the touch sensing electrodes Rx1 to Rx8 measured through the second routing wires RL1 and RL2 connected to the touch sensing electrodes Rx1 to Rx8 before a touch operation and a voltage of a touch capacitance of each the touch sensing electrodes Rx1 to Rx8 measured through the second routing wires RL1 and RL2 after the touch operation. The touch recognition processor 17 then converts the result of a differential amplification into digital data. The touch recognition processor 17 decides a touch position based on a difference between the initial capacitance and the touch capacitance using a touch recognition algorithm and outputs touch coordinate data indicating the touch position to the host controller 10.

As mentioned above, the first and second touch driving electrodes Tx11, Tx21, . . . Tx81; and Tx12, Tx22, . . . Tx82 according to one embodiment of this disclosure constitute touch driving lines in y axis direction, and the touch sensing electrodes Rx1 to Rx8 constitute touch sensing lines in x axis direction so that they cross over each other. Accordingly, if a touch is performed on a particular position of the display device, there is a variation of mutual capacitance between the touch driving lines and the touch sensing lines. It is possible to detect the touch position by measuring the variation of mutual capacitance.

In particular, it is possible to improve touch sensitivity by increasing mutual capacitance between the touch driving electrodes and touch sensing electrodes because number of the touch driving electrodes and touch sensing electrodes are increased by forming the touch driving electrode to be corresponding to the pixel electrode and forming the touch sensing electrode to be corresponding to the gate line. Furthermore, it is advantageous in that it is possible to easily manufacture a touch sensor integrated type display device having various touch recognition blocks because a size of the touch recognition block is easily adjustable by using the touch driving electrode resistance reducing wires and the touch sensing electrode resistance reducing wires.

Hereinafter, a method of manufacturing the touch sensor integrated type display device according to one embodiment of this disclosure will be described with reference to FIGS. 5A to 13B.

Figure 5A:
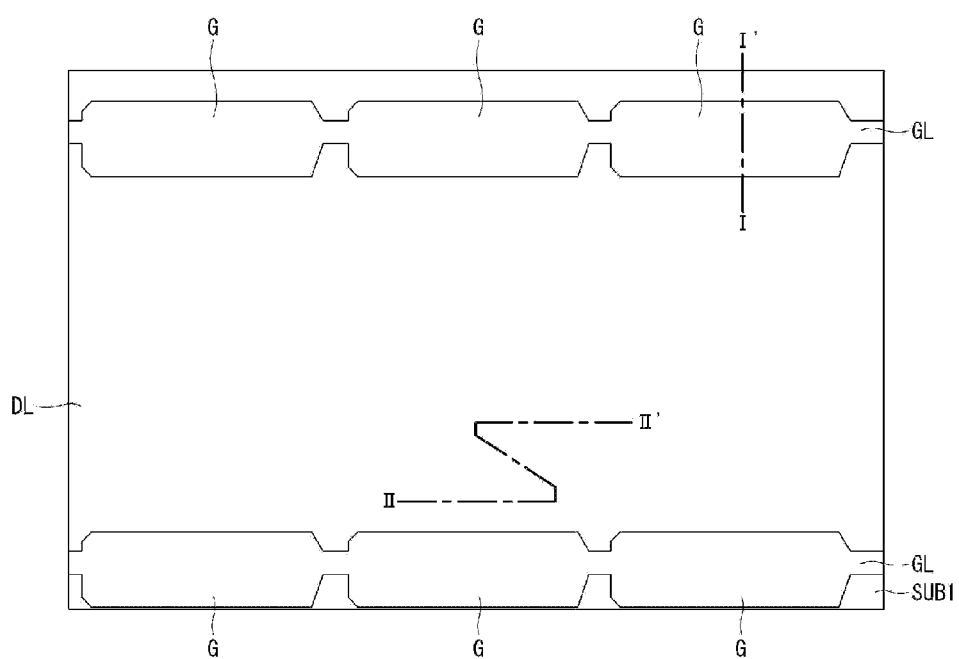
FIG. 5A is a top planar view illustrating a first mask process for manufacturing a touch sensor integrated type display device according to one embodiment of this disclosure.
Figure 5B:
FIG. 5B is a cross-sectional view taken along lines I-I' and II-II' shown in FIG. 5A.

FIG. 5A is a top planar view illustrating a first mask process for manufacturing the touch sensor integrated type display device according to one embodiment of this disclosure, and FIG. 5B is a cross-sectional view taken along lines I-I' and II-II' shown in FIG. 5A.

Referring to FIGS. 5A and 5B, a first metal layer (gate metal layer) is entirely deposited on a first substrate SUB through a deposition process as a first conductive layer. A gate line GL and a gate electrode G extended from the gate line GL are formed on the substrate SUB1 using the first mask process.

More specifically, a gate metal layer is formed on the entire surface of the substrate SUB1 as a first conductive layer by a deposition process such as a sputtering process. After a photo resist is entirely applied to the substrate SUB1 on which the first conductive layer is deposited, a first photo resist pattern (not shown) exposing a portion of the gate metal layer is formed through a photolithography process using a first mask. The first gate metal layer exposed via the first photo resist pattern is removed by a wet etching. The first photo resist pattern is then removed by an ashing process, thereby forming the gate line GL and the gate electrode G on the substrate SUB1. The gate metal layer may be selected from a metal material such as Al, AlNd, Cu, Cr, Mo, or MoTi.

Figure 6A:
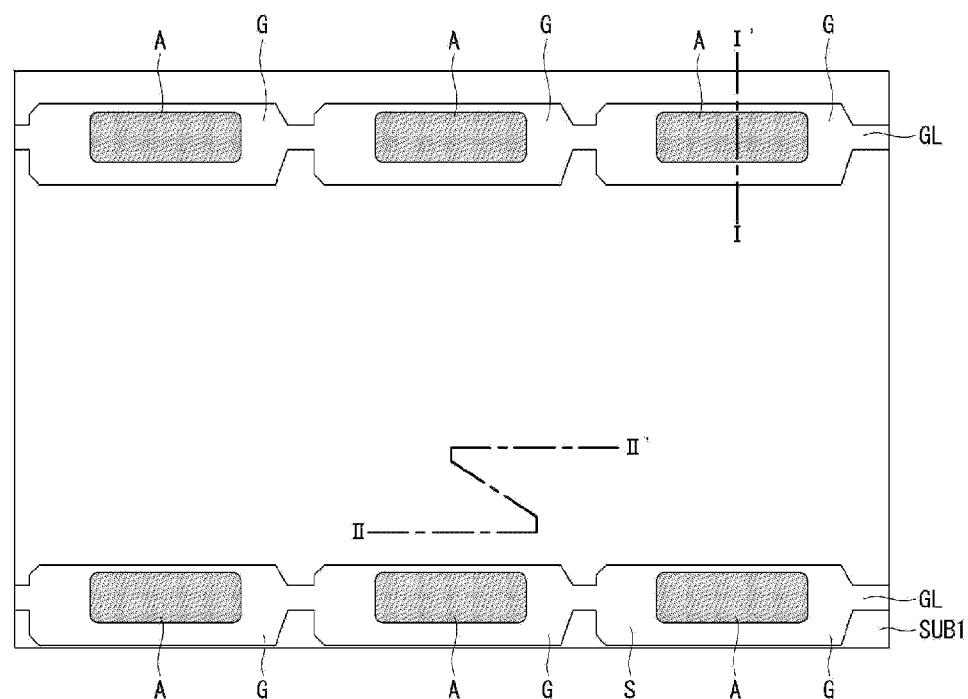
FIG. 6A is a top planar view illustrating a second mask process for manufacturing a touch sensor integrated type display device according to one embodiment of this disclosure.
Figure 6B:
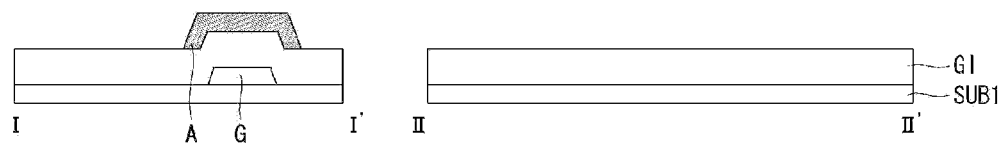
FIG. 6B is a cross-sectional view taken along lines I-I' and II-II' shown in FIG. 6A.

FIG. 6A is a top planar view illustrating a second mask process for manufacturing the touch sensor integrated type display device according to one embodiment of this disclosure, and FIG. 6B is a cross-sectional view taken along lines IT and II-II' shown in FIG. 6A.

Referring to FIGS. 6A and 6B, a gate insulation layer GI is formed on an entire surface of the substrate SUB 1 on which the gate line GL and the gate electrode G are formed. A semiconductor layer is then entirely formed on the gate insulation layer GI. A photo resist layer is entirely formed on the semiconductor layer, and a second photo resist pattern (not shown) is formed to expose regions of the semiconductor layer excluding a channel region through a photolithography process using a second mask. The semiconductor layer exposed via the second photo resist pattern is removed by an etching process. The second photo resist pattern is then removed by an ashing process, thereby forming the semiconductor pattern A.

Figure 7A:
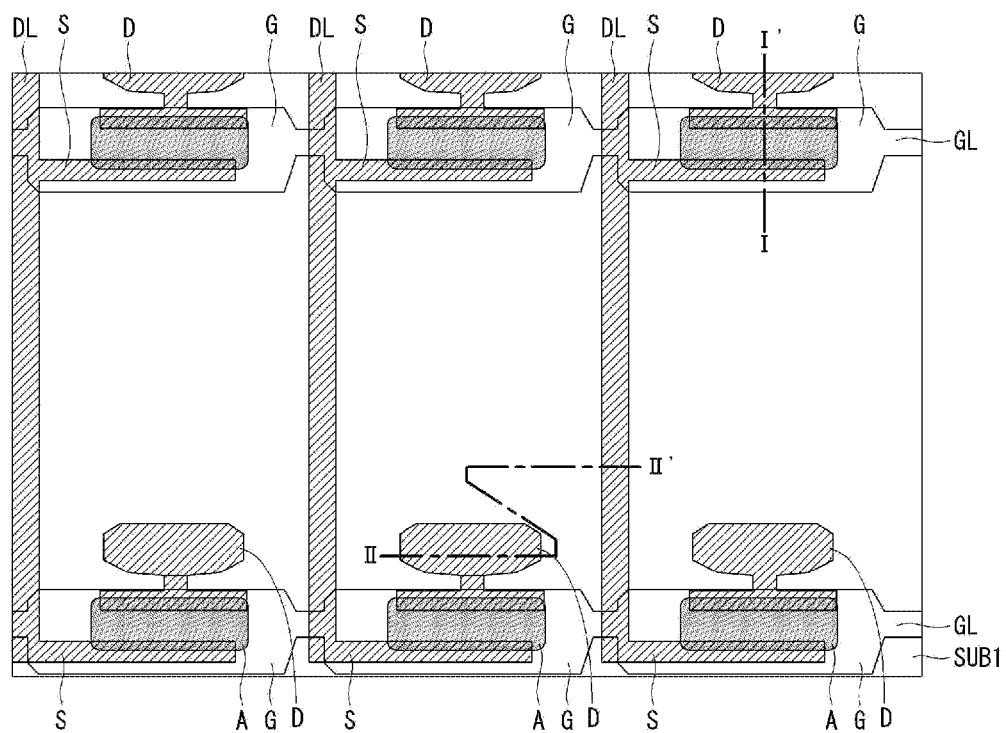
FIG. 7A is a top planar view illustrating a third mask process for manufacturing a touch sensor integrated type display device according to one embodiment of this disclosure.
Figure 7B:
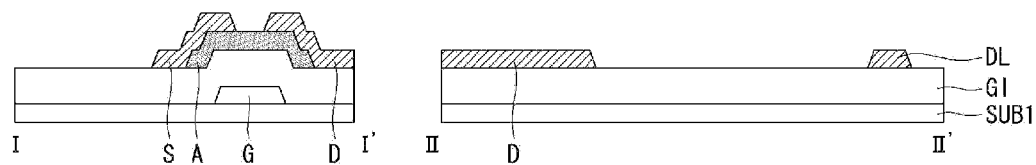
FIG. 7B is a cross-sectional view taken along lines I-I' and II-II' shown in FIG. 7A.

FIG. 7A is a top planer view illustrating a third mask process for manufacturing the touch sensor integrated type display device according to one embodiment of this disclosure, and FIG. 7B is a cross-sectional view taken along lines I-I' and II-II' shown in FIG. 7A.

Referring to FIGS. 7A and 7B, a second metal layer (data metal layer) is formed as a second conductive layer on the gate insulation layer GI on which the semiconductor pattern A is formed. And then a first conductive pattern group including a data line DL, a source electrode S extended from the data line DL, and a drain electrode D opposite to the source electrode S are formed by patterning the data metal layer through a photolithography process.

More specifically, a data metal layer is formed as a second conductive layer on the gate insulation layer GI on which the semiconductor pattern A is formed. A photo resist is entirely deposited on the data metal layer, and a third photo resist pattern (not shown) is formed through a photolithography process using a third mask. The third photo resist pattern exposes regions of the data metal layer excluding regions on which a data line, a source electrode and a drain electrode are to be formed. The data line DL and a thin film transistor TFT including the source electrode S extended from the data line DL and a drain electrode D are formed by etching the data metal layer exposed via the third photo resist pattern and removing the third photo resist pattern remained on the data metal layer. The data line DL crosses over the gate line GL with the gate insulation layer GI therebetween. The source electrode S is extended from the data line DL and the drain electrode D is opposite to the source electrode S.

Figure 8A:
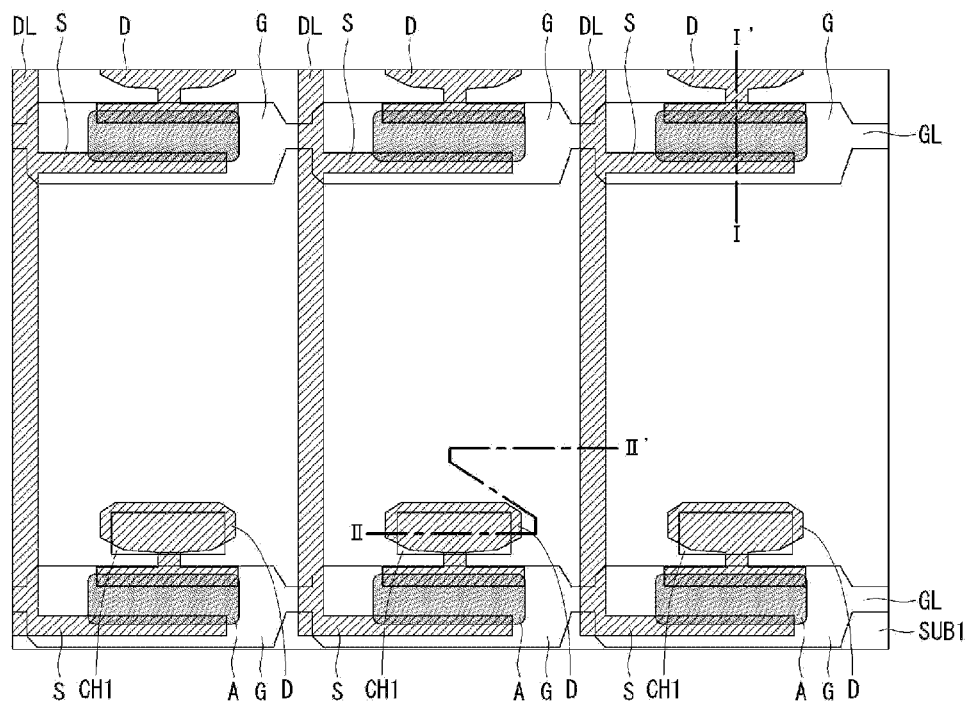
FIG. 8A is a top planar view illustrating a fourth mask process for manufacturing a touch sensor integrated type display device according to one embodiment of this disclosure.
Figure 8B:
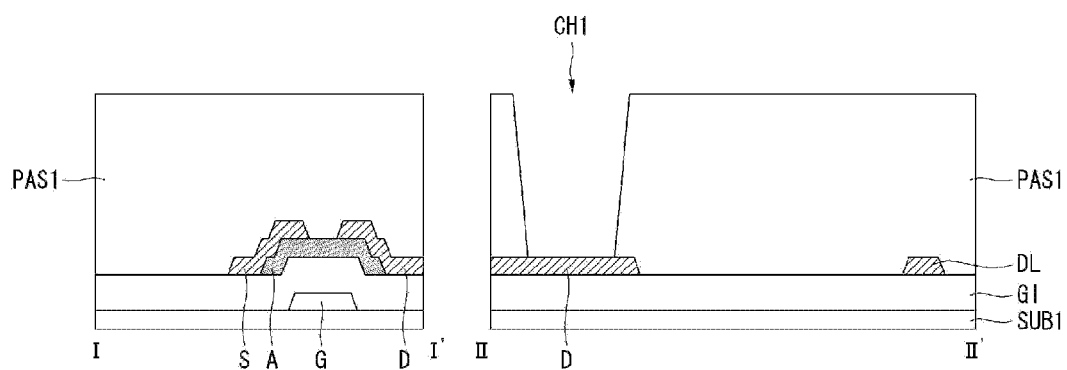
FIG. 8B is a cross-sectional view taken along lines I-I' and II-II' shown in FIG. 8A.

FIG. 8A is a top planar view illustrating a fourth mask process for manufacturing the touch sensor integrated type display device according to one embodiment of this disclosure, and FIG. 8B is a cross-sectional view taken along lines I-I' and II-II' shown in FIG. 8A.

Referring to FIGS. 8A and 8B, a first passivation layer PAS 1 is entirely formed on the gate insulation layer GI on which the first conductive pattern group is formed. And then first contact hole CH1 is formed to expose a portion of the drain electrode D by etching the first passivation layer PAS1 using a fourth mask process.

More specifically, a first passivation layer PAS 1 is entirely formed on the gate insulation layer GI on which the data line DL and the thin film transistor TFT are formed. A photo resist layer is entirely formed on the first passivation layer PAS1, and a fourth photo resist pattern (not shown) is formed to expose a portion of the drain electrode D through a photolithography process using a fourth mask. A first contact hole CH1 exposing the portion of the drain electrode D is then formed in the first passivation layer PAS1 by etching the first passivation layer PAS1 exposed via the fourth photo resist pattern and removing the fourth photo resist pattern. The first passivation layer PAS 1 may be made of a low dielectric organic material such as polyanionic cellulose (PAC).

Figure 9A:
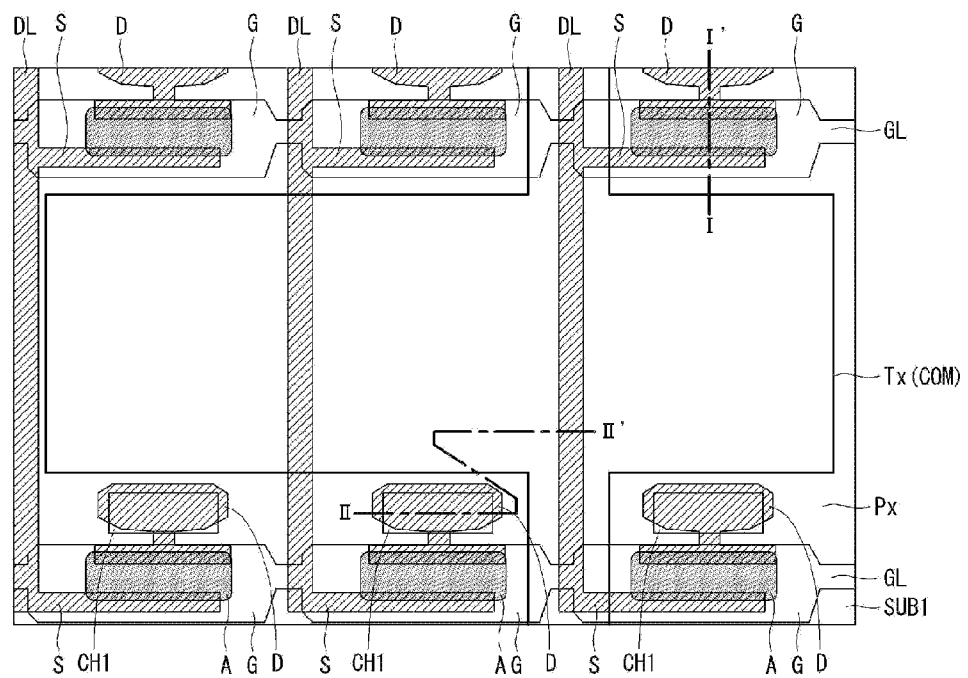
FIG. 9A is a top planar view illustrating a fifth mask process for manufacturing a touch sensor integrated type display device according to one embodiment of this disclosure.
Figure 9B:
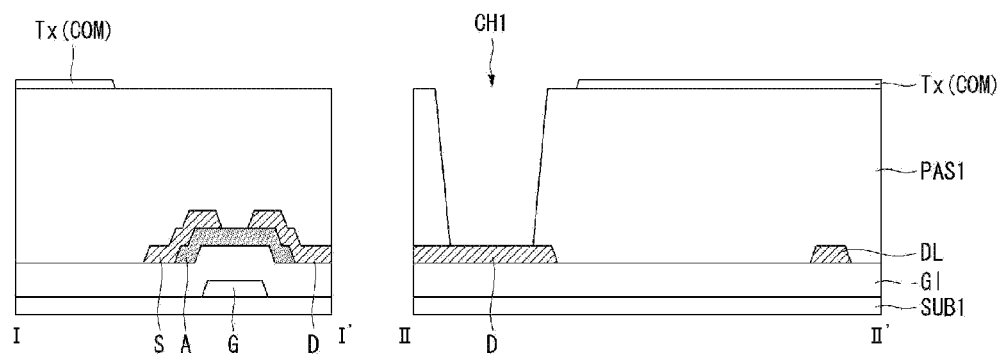
FIG. 9B is a cross-sectional view taken along lines I-I' and II-II' shown in FIG. 9A.

FIG. 9A is a top planar view illustrating a fifth mask process for manufacturing the touch sensor integrated type display device according to one embodiment of this disclosure, and FIG. 9B is a cross-sectional view taken along lines I-I' and II-II' shown in FIG. 9A.

Referring to FIGS. 9A and 9B, a first transparent conductive layer is entirely formed as a third conductive layer on the first passivation layer PAS1 in which the first contact hole CH1 is formed. And then common electrodes COM which serve touch driving electrodes Tx are formed by patterning the first transparent conductive layer using a fifth mask process.

More specifically, a first transparent conductive layer is entirely formed as a third conductive layer on the first passivation layer PAS1 in which the first contact hole CH1 is formed through a deposition process such as a plasma-enhanced chemical vapor deposition (PECVD). A photo resist layer is entirely formed on the first transparent conductive layer, and a fifth photo resist pattern (not shown) is formed through a photolithography process using a fifth mask. The fifth photo resist pattern exposes regions of the first transparent conductive layer excluding regions on which common electrodes are to be formed. The common electrodes COM which serves as the touch driving electrodes Tx are formed by etching the first transparent conductive layer exposed via the fifth photo resist pattern and removing the fifth photo resist pattern remaining on the first transparent conductive layer. The common electrodes COM which serve as the touch driving electrodes Tx may be formed to have a size as described in relation with FIGS. 1 to 3. The common electrodes COM may be made of a transparent conductive material such as indium tin oxide (ITO), indium zinc oxide (IZO), and gallium-doped zinc oxide (GZO).

Figure 10A:
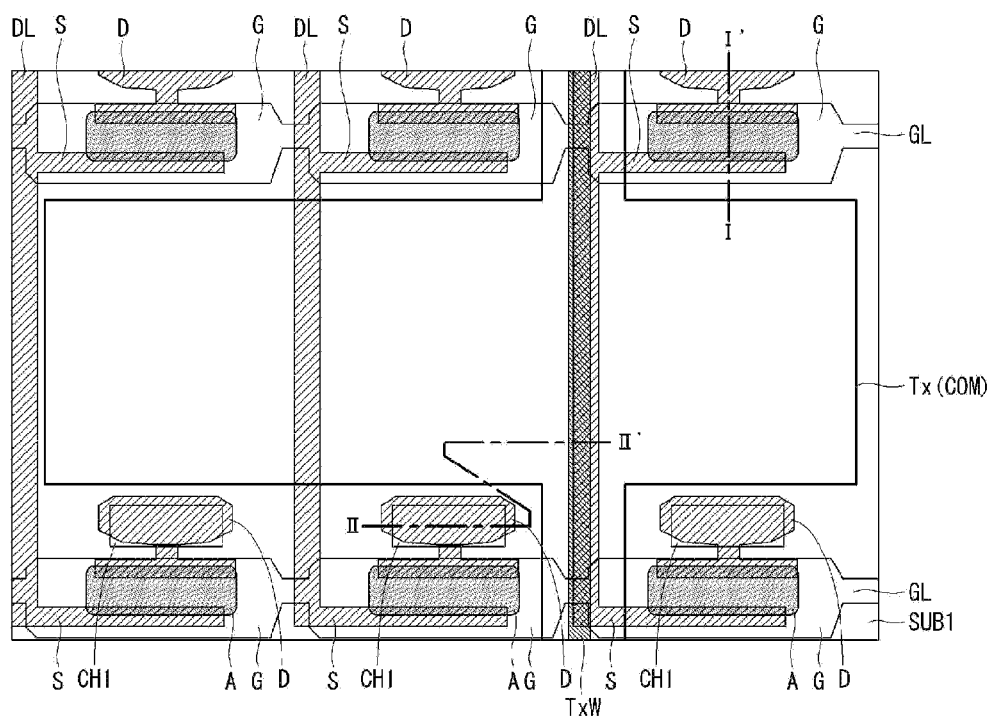
FIG. 10A is a top planar view illustrating a sixth mask process for manufacturing a touch sensor integrated type display device according to one embodiment of this disclosure.
Figure 10B:
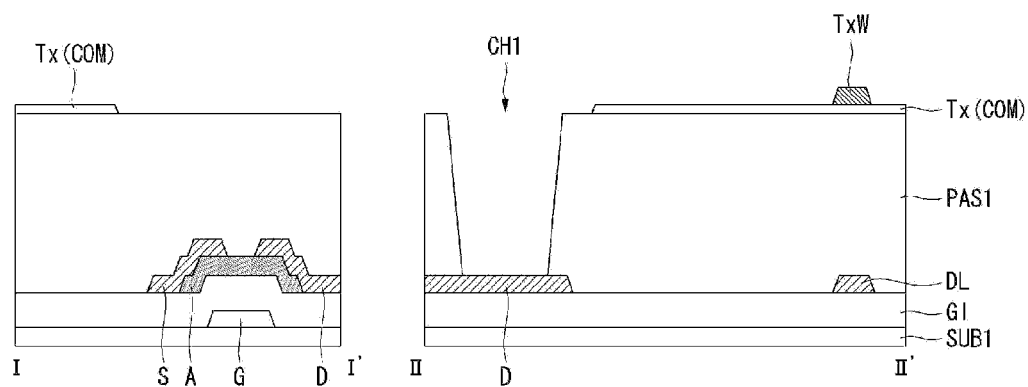
FIG. 10B is a cross-sectional view taken along lines I-I' and II-II' shown in FIG. 10A.

FIG. 10A is a top planar view illustrating a sixth mask process for manufacturing the touch sensor integrated type display device according to one embodiment of this disclosure, and FIG. 10B is a cross-sectional view taken along lines I-I' and II-II' shown in FIG. 10A.

Referring to FIGS. 10A and 10B, a third metal layer is entirely formed as fourth conductive layer on the first passivation layer PAS1 on which the common electrodes COM which serve as touch driving electrode Tx are formed through a deposition process such as a sputtering. And then touch driving electrode resistance reducing wires TxW are formed on the first passivation layer PAS 1 in parallel with the data line using a sixth mask process.

More specifically, through a deposition process such as a sputtering, a third metal layer is entirely formed as fourth conductive layer on the first passivation layer PAS1 on which the common electrodes COM which serve as touch driving electrode Tx are formed. A photo resist is entirely formed on the fourth conductive layer, and then touch driving electrode resistance reducing wires TxW are formed by patterning the fourth conductive layer through a photolithograph process using a sixth mask so that the touch driving electrode resistance reducing wires TxW are in parallel with the data line DL and contacted with the common electrodes COM which serve as touch driving electrodes Tx. It is possible to improve aperture ratio of the display device if the touch driving electrode resistance reducing wires TxW are formed to be overlapped with the data line DL. The fourth conductive layer is selected from a metal material such as Al, AlNd, Cu, Cr, Mo, or MoTi.

In the above description, the touch driving electrode Tx and the touch driving electrode resistance reducing wires TxW are respectively formed by two mask processes. However the touch driving electrode Tx and the touch driving electrode resistance reducing wires TxW may be formed through a photolithography process using a halftone mask. Provided that the process using the halftone mask is used, the touch driving electrode Tx and the touch driving electrode resistance reducing wires TxW may be formed with one mask process. The description about the process using the halftone mask is omitted because it is known as the related art.

Figure 11A:
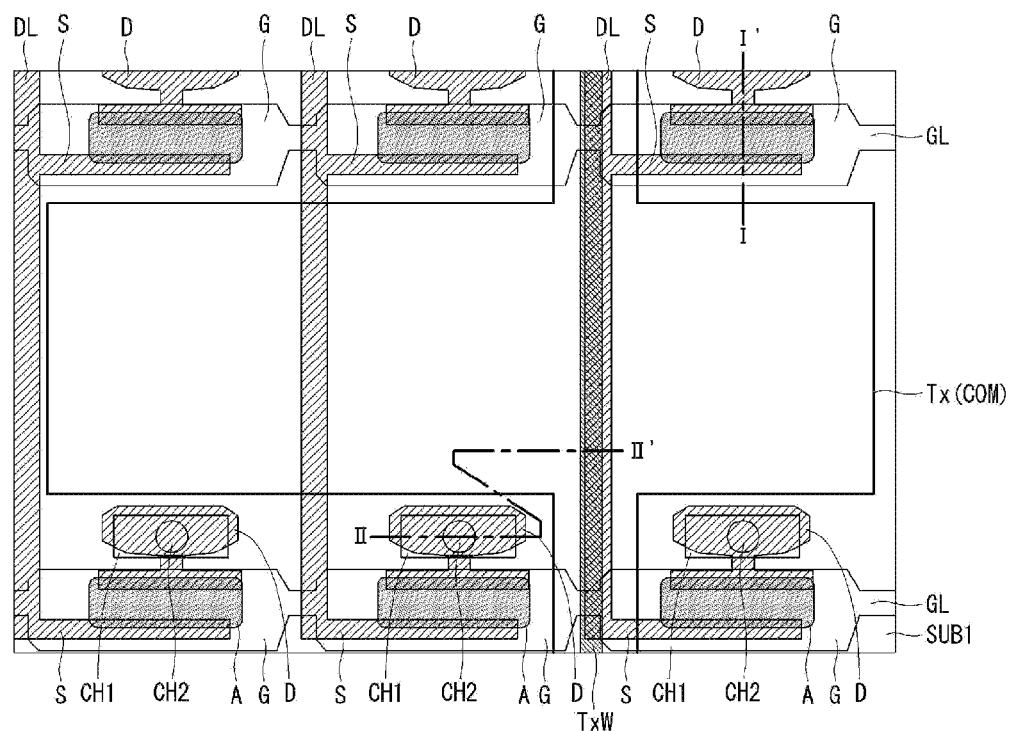
FIG. 11A is a top planar view illustrating a seventh mask process for manufacturing a touch sensor integrated type display device according to one embodiment of this disclosure.
Figure 11B:
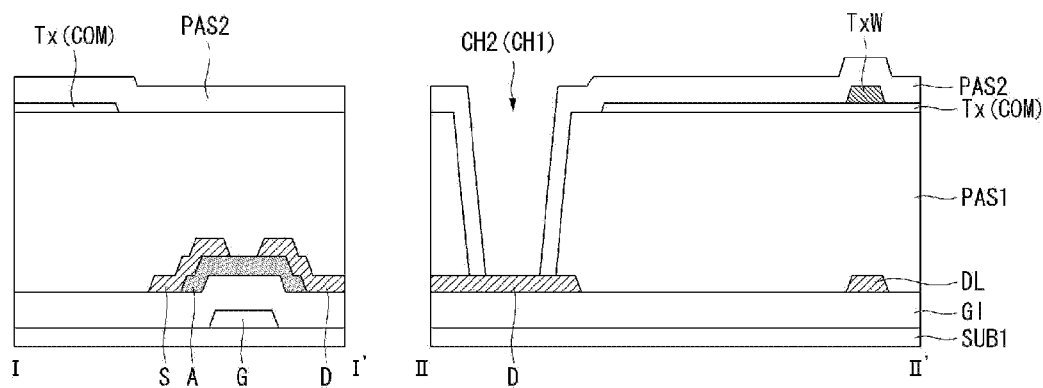
FIG. 11B is a cross-sectional view taken along lines I-I' and II-II' shown in FIG. 11A.

FIG. 11A is a top planar view illustrating a sixth mask process for manufacturing the touch sensor integrated type display device according to one embodiment of this disclosure, and FIG. 11B is a cross-sectional view taken along lines I-I' and II-II' shown in FIG. 11A.

Referring FIGS. 11A and 11B, a second passivation layer PAS2 is formed on the first passivation layer PAS1 on which the common electrode COM serving as the touch driving electrode Tx and the touch driving electrode resistance reducing wires TxW are formed. And then, a second contact hole CH2 passing through the second passivation layer PAS2 is formed to expose a portion of the drain electrode D by etching the second passivation PAS2 using a seventh mask process.

More specifically, a second passivation layer PAS2 is entirely formed on the first passivation layer PAS1 on which the common electrode COM serving as the touch driving electrode Tx and the touch driving electrode resistance reducing wires TxW are formed. A photo resist is entirely formed on the second passivation layer PAS2, and then a seventh photo resist pattern (not shown) is formed to expose a portion of the drain electrode D through a photolithography process using a seventh mask. The second passivation layer PAS2 exposed via the seventh photo resist pattern is etched, and a contact hole CH2 is formed by removing the seventh photo resist pattern. The second passivation layer PAS2 may be made of a low dielectric organic material such as polyanionic cellulose (PAC).

In this embodiment, the second contact hole CH2 is formed by etching the second passivation layer PAS2 filled into the first contact hole CH1 of the first passivation layer PAS1. However, this disclosure is not limited thereto. For example, the fourth mask process may be omitted because the first and second contact holes CH1 and CH2 may be formed at one time with one mask process. That is, the first and second contact holes CH1 and CH2 may be formed at one time by etching the first and second passivation layers PAS 1 and PAS2.

Figure 12A:
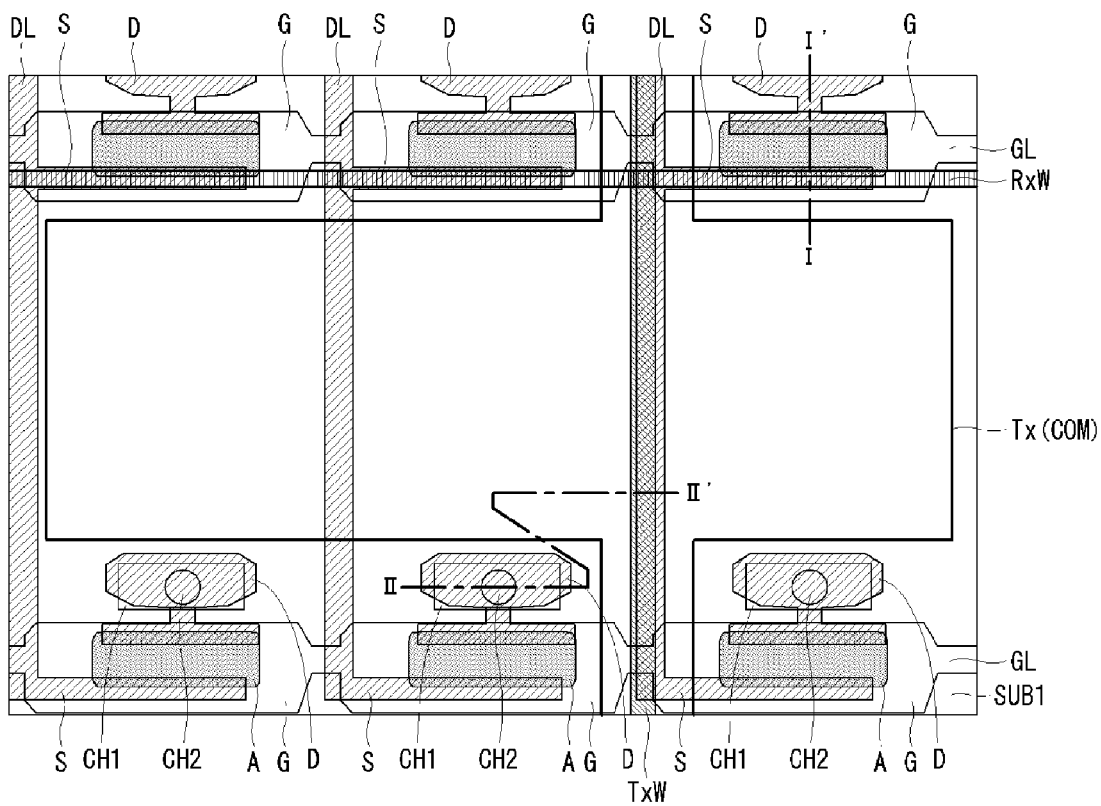
FIG. 12A is a top planar view illustrating a eighth mask process for manufacturing a touch sensor integrated type display device according to one embodiment of this disclosure.
Figure 12B:
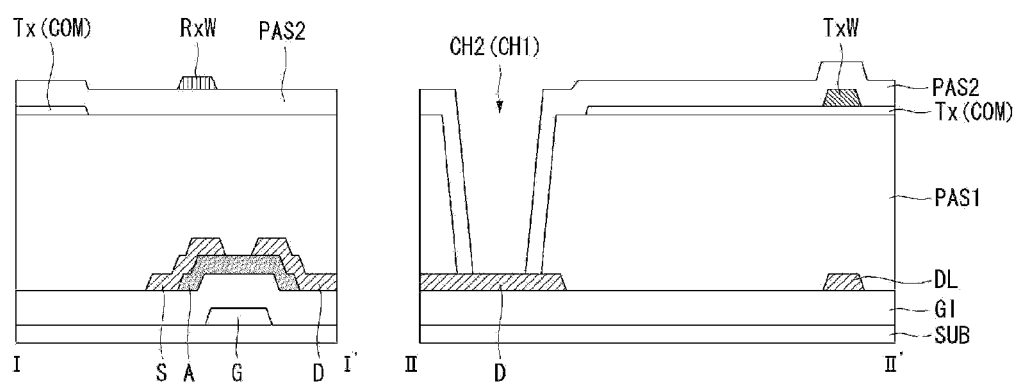
FIG. 12B is a cross-sectional view taken along lines I-I' and II-II' shown in FIG. 12A.

FIG. 12A is a top planar view illustrating a eighth mask process for manufacturing the touch sensor integrated type display device according to one embodiment of this disclosure, and FIG. 12B is a cross-sectional view taken along lines I-I' and II-II' shown in FIG. 12A.

Referring to FIGS. 12A and 12B, a fourth metal layer as fifth conductive layer is deposited on the second passivation layer PAS2 with the second contact hole CH2. And then a sensing electrode resistance reducing wire RxW is formed in parallel with the gate line GL by etching the fifth conductive layer through a eighth mask process.

More specifically, a fourth metal layer as fifth conductive layer is deposited on the second passivation layer PAS2 with the second contact hole through a deposition process such as a sputtering process. A photo resist is entirely formed on the fifth conductive layer, and an eighth photo resist pattern (not shown) is formed to expose portions excluding an area where a sensing electrode resistance reducing wire RxW is to be formed through a photolithography process using a eighth mask. The fifth conductive layer exposed via the eighth photo resist pattern is etched, and a sensing electrode resistance reducing wire RxW is formed by removing the eighth photo resist pattern. The fifth conductive layer is selected from a metal material such as Al, AlNd, Cu, Cr, Mo, or MoTi.

Figure 13A:
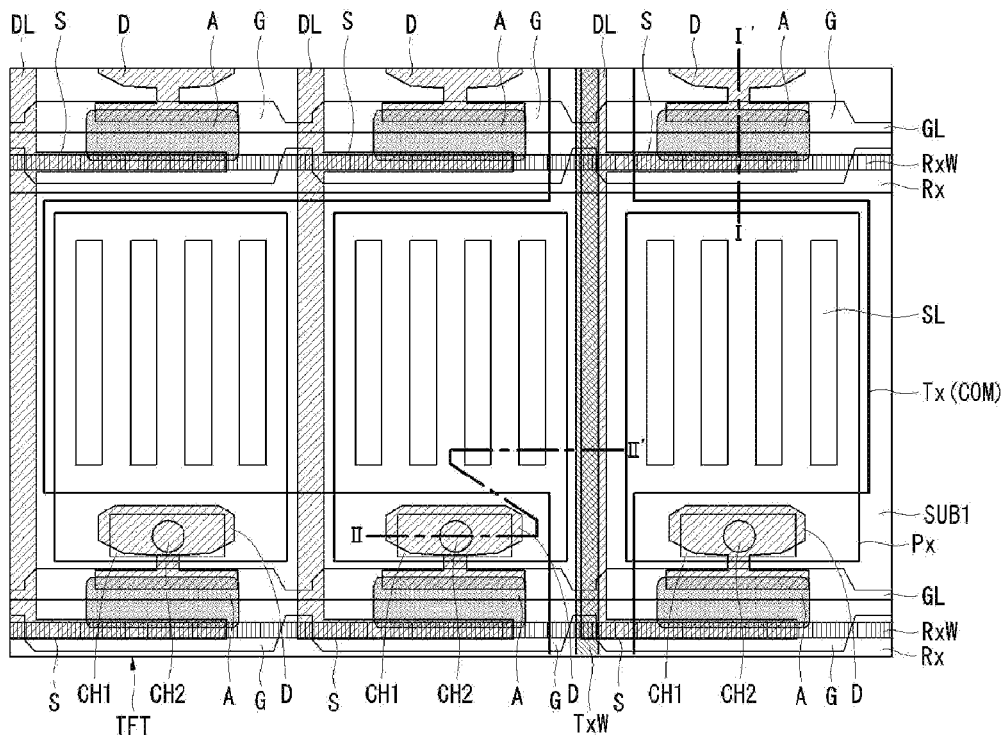
FIG. 13A is a top planar view illustrating a ninth mask process for manufacturing a touch sensor integrated type display device according to one embodiment of this disclosure.
Figure 13B:
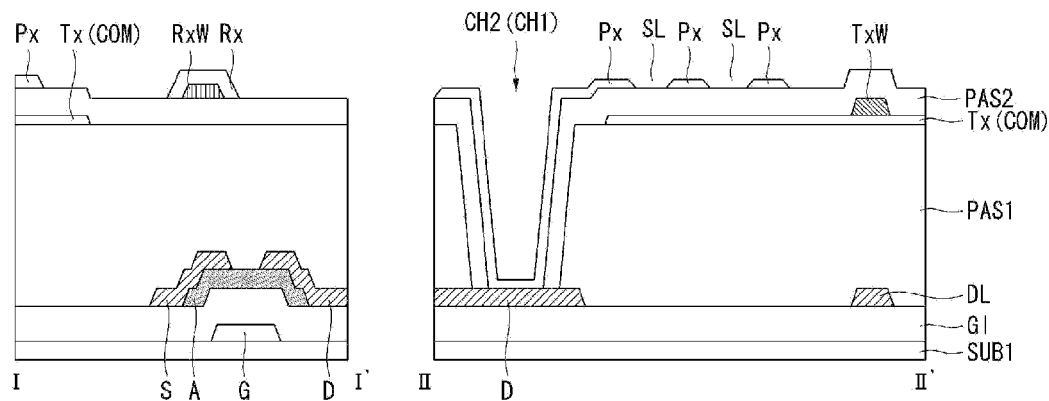
FIG. 13B is a cross-sectional view taken along lines I-I' and II-II' shown in FIG. 12A.

FIG. 13A is a top planar view illustrating a ninth mask process for manufacturing the touch sensor integrated type display device according to one embodiment of this disclosure, and FIG. 13B is a cross-sectional view taken along lines I-I' and II-II' shown in FIG. 13A.

Referring to FIGS. 13A and 13B, a second transparent conductive layer as a sixth conductive layer is deposited on the second passivation layer PAS2 on which the sensing electrode resistance reducing wire RxW is formed. And then a sensing electrode Rx and a pixel electrode resistance reducing wire RxW are formed by etching the sixth conductive layer through a ninth mask process.

More specifically, a second transparent conductive layer as a sixth conductive layer is deposited on the second passivation layer PAS2 on which the sensing electrode resistance reducing wire RxW is formed through a deposition process such as a sputtering process. A photo resist is entirely formed on the sixth conductive layer, and a ninth photo resist pattern (not shown) is formed to expose portions excluding a pixel area defined by crossing of the data line DL and gate line GL and an area where a touch sensing electrode is to be formed through a photolithography process using a ninth mask. Pixel electrodes Px are formed in pixels areas defined by crossing of the data lines DL and the gate lines GL by etching the second transparent conductive layer exposed via the ninth photo resist pattern and removing the ninth photo resist pattern. At the same time, touch sensing electrodes Rx are formed between the pixel areas disposed to be neighbored to each other with the gate line GL therebetween. The pixel electrode Px is formed to have a plurality of slits or openings SL. The second transparent conductive layer may be made of a transparent conductive material such as indium tin oxide (ITO), indium zinc oxide (IZO), and gallium-doped zinc oxide (GZO).

In the description for the eighth and ninth mask processes, the sensing electrode resistance reducing wire RxW, the touch sensing electrode Rx and the pixel electrode Px are formed by two mask processes. However the sensing electrode resistance reducing wire RxW, the touch sensing electrode Rx and the pixel electrode Px may be formed through a photolithography process using a halftone mask. Provided that the process using the halftone mask is used, the sensing electrode resistance reducing wire RxW, the touch sensing electrode Rx and the pixel electrode Px may be formed with one mask process. The description about the process using the halftone mask is omitted because it is known as the related art.

Figure 14:
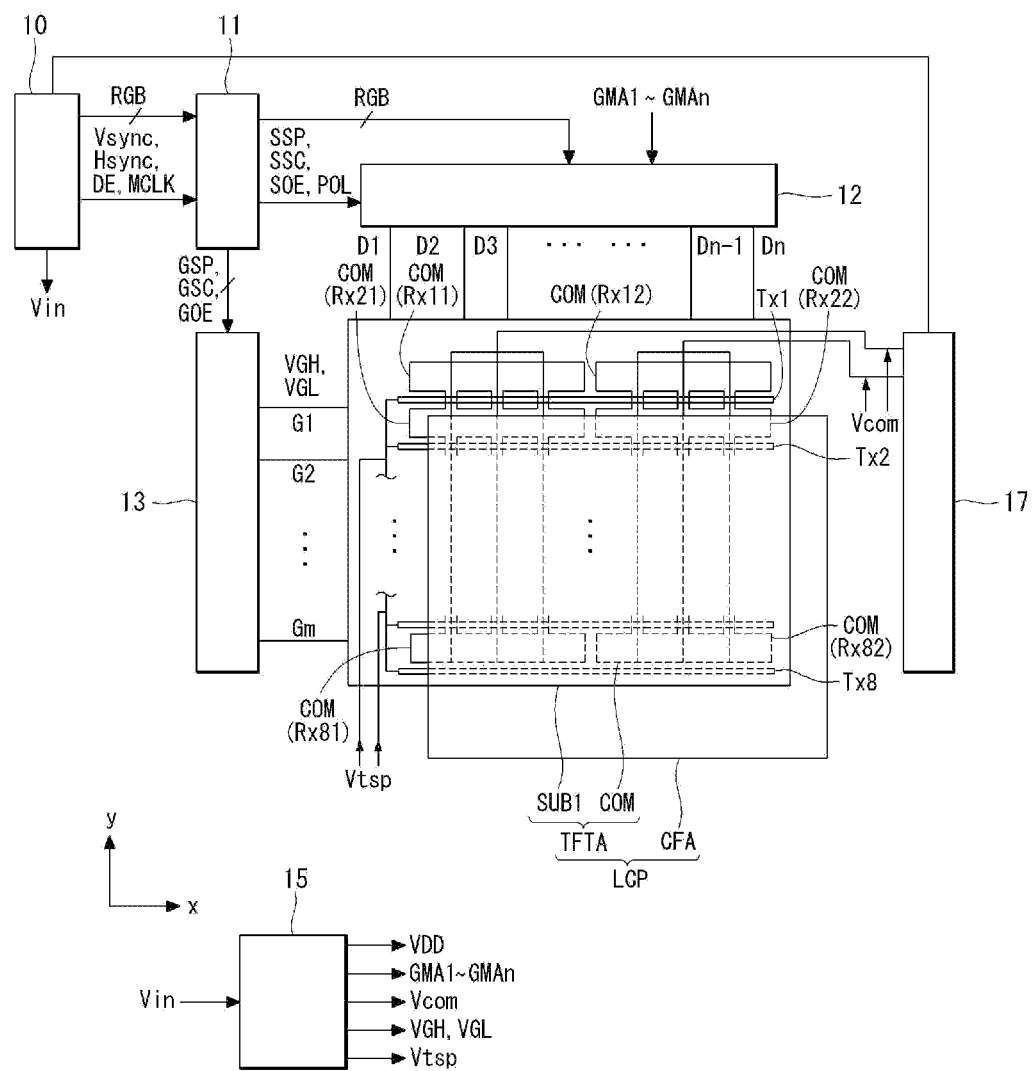
FIG. 14 is a block diagram schematically illustrating a touch sensor integrated type display device according to another embodiment of this disclosure.

A touch sensor integrated type display device according to another embodiment of this disclosure is described in detail with reference to FIGS. 14 and 15. FIG. 14 is a block diagram schematically illustrating a touch sensor integrated type display device according to another embodiment of this disclosure, and FIG. 15 is a block diagram schematically illustrating a relationship between touch driving electrodes and touch sensing electrodes of a touch sensor integrated type display device according to another embodiment of this disclosure.

Figure 15:
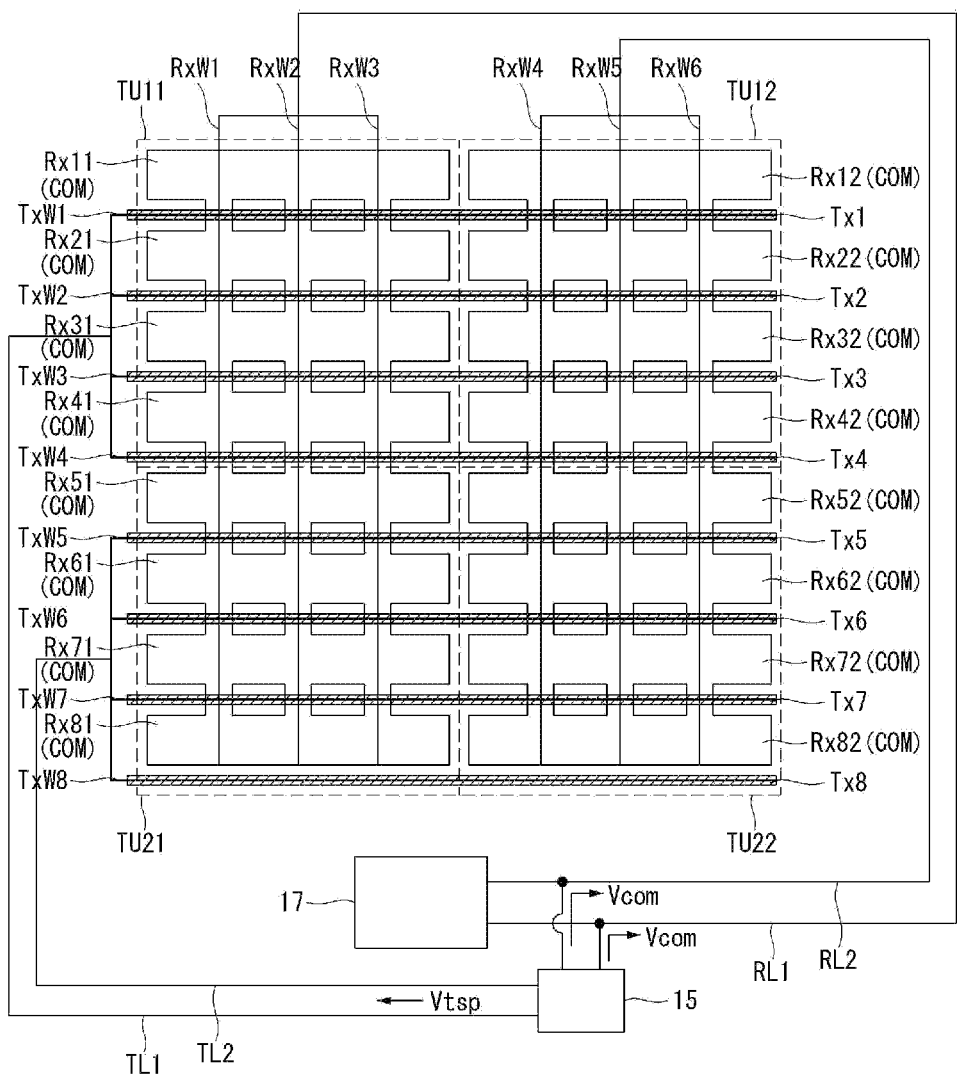
FIG. 15 is a block diagram schematically illustrating a relationship between touch driving electrodes and touch sensing electrodes of a touch sensor integrated type display device according to another embodiment of this disclosure.

Referring to FIGS. 14 and 15, the touch sensor integrated type liquid crystal display according to another embodiment of this disclosure includes a liquid crystal display panel LCP, a host controller 10, a timing controller 11, a data driver 12, a gate driver 13, a power supply unit 15, and a touch recognition processor 17.

In the touch sensor integrated type liquid crystal display according to another embodiment of this disclosure, the description of the liquid crystal display panel LCP is omitted because it is substantially same to the liquid crystal display panel LCP according to the one embodiment of this disclosure.

Referring to FIGS. 14 and 15, the common electrode COM according to another embodiment of this disclosure is a plurality of electrodes divided into a first direction (for example, x axis direction) and a second direction (for example, y axis direction) crossing the first direction but connected to each other in the second direction. The plurality of electrodes constituting the common electrode COM serve as a plurality of touch sensing electrodes Rx11, Rx21, Rx31, . . . Rx81; and Rx12, Rx22, Rx32, . . . Rx82.

Each of the touch sensing electrodes Rx11, Rx21, Rx31, . . . Rx81; and Rx12, Rx22, Rx32, . . . Rx82 is formed to include resistance reducing wires for reducing resistance of them. More specifically, among the plurality of touch sensing electrodes Rx11, Rx21, Rx31, . . . Rx81; and Rx12, Rx22, Rx32, . . . Rx82, first touch sensing electrodes Rx11, Rx21, Rx31, . . . Rx81 arranged in the second direction are connected to each other by at least one connection portion. And then first resistance reducing wires RxW1, RxW2 and RxW3 are formed on the first touch sensing electrodes Rx11, Rx21, Rx31, . . . and TxR1 to reduce resistance thereof. Also second touch sensing electrodes Rx12, Rx22, Rx32, . . . Rx82 arranged in the second direction are connected to each other by at least one connection portion. And then second resistance reducing wires RxW4, RxW5 and RxW6 are formed on the second touch sensing electrodes Rx12, Rx22, Rx32, . . . and Rx82 to reduce resistance thereof.

The embodiment shown in FIG. 15 illustrates an example in which the touch sensing electrodes constitute two touch sensing lines. That is, the embodiment of FIG. 15 illustrates an example in which one touch sensing line is constituted by the first touch sensing electrodes Rx11, Rx21, . . . and Rx81 and the first resistance reducing wires RxW 1, RxW2 and RxW3, and another touch sensing line is constituted by the second touch sensing electrodes Rx12, Rx22, . . . and Rx82 and the second resistance reducing wires RxW4, RxW5 and RxW6. The first and second resistance reducing wires RxW1 to RxW3 and RxW4 to RxW6 are connected to the power supply unit 15 and the touch recognition processor 17 via the first routing wires RL1 and RL2, respectively.

In another embodiment shown in FIG. 15, three the first resistance reducing wires RxW1, RxW2 and RxW3 are used to constitute the first touch sensing line and three the second resistance reducing wires RxW4, RxW5 and RxW6 are used to constitute the second touch sensing line. However, this disclosure is not limited thereto. For example, one or two resistance reducing wires may be used to constitute each of the first and second touch sensing lines. Otherwise four and more resistance reducing wires may be used to constitute each of the first and second touch sensing lines.

On the other hand, touch driving electrodes Tx1 to Tx8 constituting the touch sensor according to another embodiment of this disclosure are arranged in the first direction (for example, x axis direction) to cross over the first and second resistance reducing wires RxW1 to RxW3 and RxW4 to RxW6 between the first and second touch sensing electrodes Rx11, Rx12 and Rx21, Rx22; Rx21, Rx22 and Rx31, Rx32; Rx31, Rx32 and Rx41, Rx42; Rx41, Rx42 and Rx51, Rx52; Rx51, Rx52 and Rx61, Rx62; Rx61, Rx62 and Rx71, Rx72; and Rx71, Rx72 and Rx81, Rx82. Another resistance reducing wires TxW1 to TxW8 are formed on the touch driving electrodes Tx1 to Tx8, respectively. Also, the touch driving electrodes Tx1 to Tx8 are separated from each other, but they may be grouped by the resistance reducing wires TxW1 to TxW8. For example, the first to fourth touch driving electrodes Tx1 to Tx4 are grouped by the third to sixth resistance reducing wires TxW1 to TxW4, and the fifth to eighth touch driving electrodes Tx5 to Tx8 are grouped by the seventh to tenth resistance reducing wires TxW5 to TxW8. Accordingly, the first to eighth touch driving electrodes Tx1 to Tx8 are grouped by the third to tenth resistance reducing wires TxW1 to TxW8 to form two touch driving lines including a first touch driving line Tx1 to Tx4 and TxW1 to TxW4, and a second touch driving line Tx5 to Tx8 and TxW5 and TxW8. The first driving line Tx1 to Tx4 and TxW1 to TxW4 is connected to the power supply unit 15 via the second routing wire TL1, and the second driving line Tx5 to Tx8 and TxW5 to TxW8 are connected to the power supply unit 15 via the second routing wire TL2.

The touch sensor according to another embodiment of this disclosure includes the touch sensing electrodes Rx11, Rx21, . . . , and Rx81; and Rx12, Rx22, . . . and Rx82, and the touch driving electrodes Tx1 to Tx8. And an unit of touch recognition block may be determined by appropriately grouping the touch sensing electrodes Rx11, Rx21, . . . , and Rx81; and Rx12, Rx22, . . . and Rx82 and the touch driving electrodes Tx1 to Tx8 using the first to tenth resistance reducing wires RxW1 to RxW6 and TxW1 to TxW8. In example shown in FIG. 15, four touch recognition block TU11, TU12, TU21 and TU22 are formed by sixteen touch sensing electrodes Rx11, Rx21, . . . , and Rx81; and Rx12, Rx22, . . . and Rx82, eight touch driving electrodes Tx1 to Tx8, and fourteen resistance reducing wires RxW1 to RxW6 and TxW1 to TxW8.

More specifically, a first touch recognition block TU11 is determined by the first touch sensing electrodes Rx11, Rx21, Rx31 and Rx41 connected to each other by the resistance reducing wires RxW1 to RxW3, and the first to fourth touch driving electrodes Tx1 to Tx4 connected to each other by the resistance reducing wires TxW1 to TxW4. A second touch recognition block TU12 is determined by the second touch sensing electrodes Rx12, Rx22, Rx32 and Rx42 connected to each other by the resistance reducing wires RxW4 to RxW6, and the first to fourth touch driving electrodes Tx1 to Tx4 connected to each other by the resistance reducing wires TxW1 to TxW4. A third touch recognition block TU21 is determined by the first touch sensing electrodes Rx51, Rx61, Rx71 and Rx81 connected to each other by the resistance reducing wires RxW1 to RxW3, and the fifth to eighth touch sensing electrodes Tx5 to Tx8 connected to each other by the resistance reducing wires TxW5 to TxW8. A fourth touch recognition block TU22 is determined by the second touch sensing electrodes Rx52, Rx62, Rx72 and Rx82 connected to each other by the resistance reducing wires RxW4 to RxW6, and the fifth to eighth touch driving electrodes Tx5 to Tx8 connected to each other by the resistance reducing wires TxW5 to TxW8.

The mentioned above touch sensing electrodes Rx11, Rx21, . . . Rx81; and Rx12, Rx22, . . . Rx82 serve as common electrodes COM, and formed on the first substrate SUB1 along with the pixel electrodes Px in a horizontal electrical field driving type display device. And the pixel electrodes Px are formed in areas defined by the crossing of the gate lines G1 to Gm and the data lines D1 to Dn as shown in FIG. 2.

Each of the touch sensing Rx11, Rx21, . . . Rx81; and Rx12, Rx22, . . . Rx82 are formed be in opposite to several to several tens of the pixel electrodes Px, but may be formed be in opposite to one pixel electrode Px.

In the mentioned above touch sensor integrated type display device according to another embodiment of this disclosure, a touch driving voltage Vtsp is supplied to the first to eighth touch driving electrodes TX1 to TX8 via the power supply unit 15 during a touch operation. On the other hand, a common voltage Vcom is supplied to the first and second touch sensing electrodes Rx11, Rx21, . . . Rx81; and Rx12, Rx22, . . . Rx82 via the power supply unit 15 during a display operation, and touch sensing voltages received from the touch sensing electrodes Rx11, Rx21, . . . Rx81; and Rx12, Rx22, . . . Rx82 supply to the touch recognition processor 17 during the touch operation. Accordingly, the first and second touch sensing electrodes Rx11, Rx21, . . . Rx81; and Rx12, Rx22, . . . Rx82 serve as the common electrode of the display device during the display operation, and serve as the touch sensing electrodes of the touch sensor during the touch operation.

In the mentioned above touch sensor integrated type display device, one touch sensing electrode and one pixel electrode may be formed in one to one, otherwise one to n (wherein, n is two or more natural number). Also, each of the first and second resistance reducing wires RxW1 to RxW3 and RxW4 to RxW6 may be formed to be corresponding to one data line, otherwise several to several tens of the data line. Also, each of the touch driving electrodes Tx1 to Tx8 may be formed to be corresponding to one gate line, otherwise several to several tens of the gate lines. According to the construction, it is possible to improve touch sensitivity by increasing mutual capacitance between the touch driving electrodes and touch sensing electrodes because number of the touch driving electrodes and touch sensing electrodes are increased. Furthermore, it is possible to easily adjust number of the touch driving electrodes and touch sensing electrodes according to need because the touch driving electrodes and the touch sensing electrodes may be formed to be corresponding to the gate lines and data lines.

The touch sensor integrated type display device according to another embodiment of this disclosure will be described in detail with reference to FIGS. 16A and 16B.

Figure 16A:
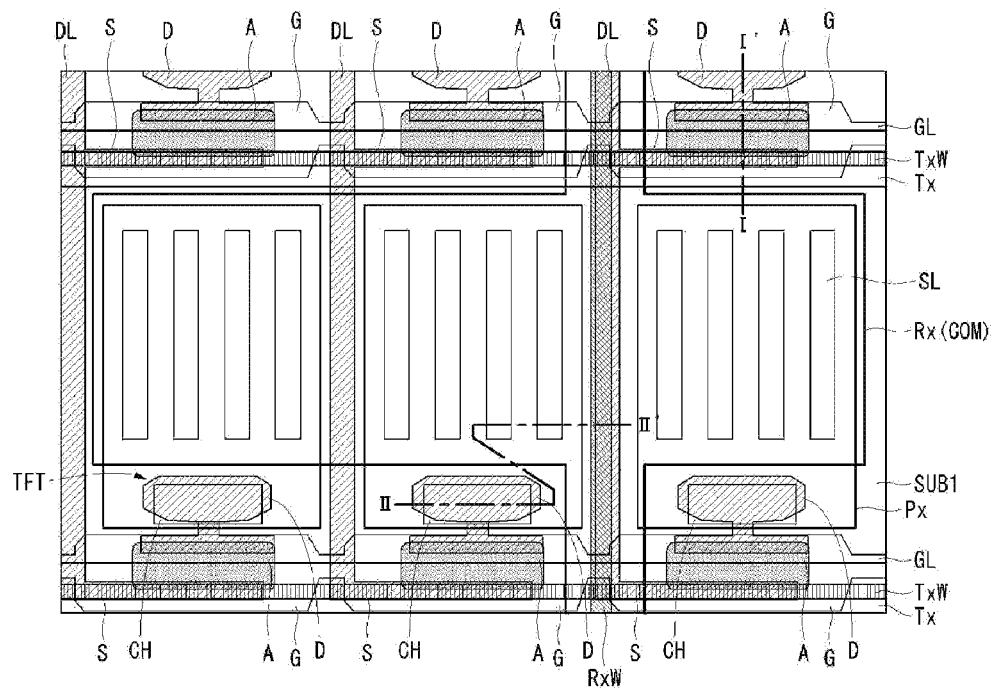
FIG. 16A is a top planar view illustrating a portion of a touch sensor integrated type display device according to another embodiment of this disclosure.
Figure 16B:
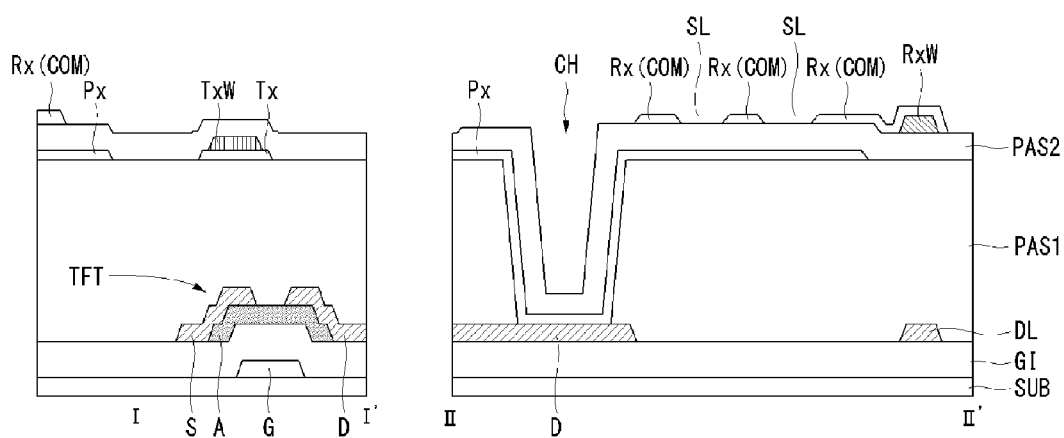
FIG. 16B is a cross-sectional view taken along lines I-I' and II-II' of FIG. 16A.

Referring to FIGS. 16A and 16B, the touch sensor integrated type display device according to another embodiment of this disclosure includes gate lines GL and data lines DL formed on substrate SUB1 of a thin film transistor array TFTA to cross over to each other, thin film transistors TFTs respectively formed at crossings of the gate lines GL and the data lines DL, pixel electrodes Px formed in areas which are defined by crossings of the gate lines GL and the data lines DL, and common electrodes COM positioned to be opposite to the pixel electrodes Px. The common electrode COM serves as a touch driving electrode Tx. Accordingly, it is referred to as a common electrode COM, a touch driving electrode Tx, or a a common electrode COM which serves as a touch driving electrode Tx according to need.

In the construction, the thin film transistors TFTs may include a gate electrode G extended from the gate line GL, an active layer A formed on a gate insulation layer G1 covering the gate line GL and the gate electrode G so as to overlap with the gate electrode G, a source electrode S extended from the data line D1 which is formed on a first passivation layer PAS1 covering the active layer A, and a drain electrode opposite to the source electrode S.

Pixel electrodes Px are formed on a first passivation layer PAS1 in pixel areas defined by crossings of the gate lines GL and the data lines DL. Also, a touch driving electrode Tx is formed between the pixel electrodes which are neighboring to each other with the gate line GL therebetween, and formed in parallel with the gate line GL. The touch driving electrode Tx may be formed to be overlapped with the gate line GL. Each of the pixel electrode Px is connected to the drain electrode D exposed via the contact hole CH of the first passivation layer PAS 1.

First and second resistance reducing wires (hereinafter referred to as "driving electrode resistance reducing wire") TxW (TxW1 to TxW4 and TxW5 to TxW8 of FIG. 15) are formed on the touch driving electrodes Tx (Tx1 to Tx8 of FIG. 15), respectively, and arranged in parallel with the gate line GL to reduce the resistance of the touch driving electrodes Tx (Tx1 to Tx8 of FIG. 15).

A second passivation layer PAS2 is formed on the first passivation layer PAS1 on which the driving electrode resistance reducing wires TxW and the touch driving electrodes Tx are formed. Third and fourth resistance reducing wires (hereinafter referred to as "sensing electrode resistance reducing wire") RxW (RxW1 to RxW3 and RxW4 to RxW6 of FIG. 15) are formed in parallel with the data line GL (that is, in x axis direction) on the second passivation PAS2. The sensing electrode resistance reducing wires RxW and the data lines DL may be formed in one to one, otherwise one to several or one to several tens.

Touch sensing electrodes Rx (Rx11, Rx21, Rx31, . . . Rx81; and Rx12, Rx 22, Rx32, . . . Rx82 of FIG. 15) which serve as the common electrodes COM are formed on the second passivation layer PAS2 on which the sensing electrode resistance wires RxW are formed. The touch sensing electrodes Rx are arranged in parallel with the gate line GL to be overlapped with the pixel electrodes Px and connected to the sensing electrode resistance reducing wires RxW. Each of the touch sensing electrodes Rx and the pixel electrodes Px may be formed in one to one, otherwise one to several or one to several tens. Each of the touch sensing electrodes Rx may have a plurality of slits or openings SL.

In the touch sensor integrated type display device according to another embodiment of this disclosure, the pixels electrodes Px formed on the first passivation layer PAS1 has no slit or openings, and the touch sensing electrode Rx has slits or openings SL as shown in FIGS. 16A and 16B. However this disclosure is no limited thereto. For example, if the one of the touch sensing electrode Rx and the pixel electrode Px has slits or openings, the other of them has no slits or openings.

In the touch sensor integrated type display device according to another embodiment of this disclosure, there is described that the common electrode COM serves as the touch sensing electrode Rx. However the common electrode COM may serve as the touch driving electrode Tx if the common voltage Vcom is supplied to the touch common electrode Tx from the power supply unit 15 in a display driving operation, a touch driving voltage Vtsp is supply to the common electrode COM from the power supply unit 15 in a touch driving operation.

Again, referring to FIGS. 14 and 15, the gate driver 13 sequentially outputs a gate pulse (or a scan pulse) under the control of the timing controller 11 during a display driving operation. The gate driver 13 shifts a swing voltage of the gate pulse to a gate high voltage VGH and a gate low voltage VGL. The gate pulse output from the gate driver 13 is synchronized with the data voltage output from the data driver 12 and is sequentially supplied to the gate lines G1 to Gm. The gate high voltage VGH is equal to or greater than a threshold voltage of the thin film transistor TFT, and the gate low voltage VGL is less than the threshold voltage of the thin film transistor TFT. A plurality of gate driving integrated circuits (ICs) of the gate driver 13 may be connected to the gate lines G1 to Gm formed on the first substrate SUBS1 of the TFT array TFTA through a tape automated bonding (TAB) process. Alternatively, the gate driving ICs of the gate driver 13 may be directly formed on the first substrate SUBS1 of the TFT array TFTA along with pixels through a gate-in-panel (GIP) process.

The data driver 12 samples and latches digital video data RGB under the control of the timing controller 11. The data driver 12 converts the digital video data RGB into positive and negative gamma compensation voltages GMA1 to GMAn and inverts a polarity of the data voltage. The positive and negative data voltages output from the data driver 12 are synchronized with the gate pulses output from the gate driver 13. A plurality of source driving ICs of the data driver 12 may be connected to the data lines D1 to Dn formed on the first substrate SUBS1 of the TFT array TFTA through a chip-on glass (COG) process or the TAB process. The source driving ICs may be integrated inside the timing controller 11 and thus may be implemented as a single chip IC along with the timing controller 11.

The timing controller 11 generates timing control signals for controlling operation timings of the gate driver 13 and the data driver 12 using timing signals Vsync, Hsync, DE, and MCLK, which are received from the external host controller 10 and are used to drive the touch sensor integrated type liquid crystal display. The timing control signals include a gate timing control signal for controlling the operation timing of the gate driver 13 and a data timing control signal for controlling the operation timing of the data driver 12 and the polarity of the data voltage.

The gate timing control signal includes a gate start pulse GSP, a gate shift clock GSC, a gate output enable GOE, and the like. The gate start pulse GSP is applied to a first gate driving IC of the gate driver 13 to output a first gate pulse in each frame period and controls a shift start timing of the first gate driving IC. The gate shift clock GSC is commonly input to the gate driving ICs of the gate driver 13 and also shifts the gate start pulse GSP. The gate output enable GOE controls output timings of the gate driving ICs of the gate driver 13.

The data timing control signal includes a source start pulse SSP, a source sampling clock SSC, a polarity control signal POL, a source output enable SOE, and the like. The source start pulse SSP is applied to a first source driving IC of the data driver 12 to firstly sample the data and controls a data sampling start timing. The source sampling clock SSC controls a sampling timing of data inside the source driving ICs based on a rising or falling edge thereof. The polarity control signal POL controls the polarity of the data voltage output from the source driving ICs. The source output enable SOE controls output timings of the source driving ICs. If the digital video data RGB is input to the data driver 102 through a mini low voltage differential signaling (LVDS) interface, the source start pulse SSP and the source sampling clock SSC may be omitted.

The power supply unit 15 is implemented as a DC-DC converter including a pulse width modulation (PWM) circuit, a boost converter, a regulator, a charge pump, a voltage divider, an operational amplifier, etc. The power supply unit 15 regulates a voltage input from the host controller 10 and generates voltages required to drive the liquid crystal display panel LCP, the data driver 12, the gate driver 13, the timing controller 11, and the backlight unit (not shown).

The voltages generated by the power supply unit 15 include a high potential power voltage VDD, the gate high voltage VGH, the gate low voltage VGL, a common voltage Vcom, positive and negative gamma reference voltages GMA1 to GMAn, a touch driving voltage Vtsp, and the like. The common voltage Vcom is supplied to the common electrodes COM under the control of the host controller 10 during a display driving operation. Alternatively, the common voltage Vcom may be supplied to the common electrode COM under the control of the timing controller 11 during a display driving operation. The touch driving voltage Vtsp is supplied to the touch driving electrodes Tx1 to Tx8 under the control of the host controller 10 during a touch driving operation. Alternatively, the touch driving voltage Vtsp may be supplied to the touch driving electrodes Tx1 to Tx8 under the control of the timing controller 11 during a touch driving operation.

In the embodiment shown in FIG. 14, the touch driving voltage Vtsp is supplied to the touch driving electrodes Tx1 to Tx8 through the power supply unit 15, but this disclosure is not limited thereto. For example, the touch driving voltage Vtsp is supply to the touch driving electrodes Tx1 to Tx8 through the touch recognition processor 17 under the control of the host controller 10 or the timing controller 11.

The host controller 10 transfers the digital video data RGB of an input image and the timing signals Vsync, Hsync, DE, and MCLK driving the touch sensor integrated type liquid crystal display to the timing controller 11 through an interface, such as the LVDS interface and a transition minimized differential signaling (TMDS) interface. When the touch sensor integrated type liquid crystal display is driven so as to display the image on its screen, the host controller 10 supplies control signal Vin for controlling the power supply unit 15, so that the common voltage Vcom can be supplied to the common electrode COM. When the touch sensor integrated type liquid crystal display is driven for the touch recognition, the host controller 10 supplies a control signal Vin for controlling the power supply unit 15, so that the touch driving voltage Vtsp can be supplied to the touch driving electrodes Tx1 to Tx8.

The touch recognition processor 17 differentially amplifies a difference voltage between a voltage of an initial capacitance of each the touch sensing electrodes Rx11, Rx21, . . . Rx81; and Rx12, Rx22, . . . Rx82 measured through the second routing wires RL1 and RL2 connected thereto before a touch operation and a voltage of a touch capacitance of each the touch sensing electrodes Rx11, Rx21, . . . Rx81; and Rx12, Rx22, . . . Rx82 measured through the second routing wires RL1 and RL2 after the touch operation. The touch recognition processor 17 then converts the result of a differential amplification into digital data. The touch recognition processor 17 decides a touch position based on a difference between the initial capacitance and the touch capacitance using a touch recognition algorithm and outputs touch coordinate data indicating the touch position to the host controller 10.

As mentioned above, the first and second touch driving electrodes Rx11, Rx21, . . . Rx81; and Rx12, Rx22, . . . Rx82 according to another embodiment of this disclosure constitute touch sensing in y axis direction, and the touch driving electrodes Tx1 to Tx8 constitute touch driving lines in x axis direction so that they cross over each other. Accordingly, if a touch is performed on a particular position of the display device, there is a variation of mutual capacitance between the touch driving lines and the touch sensing lines. It is possible to detect the touch position by measuring the variation of mutual capacitance is generated.

In particular, it is possible to improve touch sensitivity by increasing mutual capacitance between the touch driving electrodes and touch sensing electrodes because number of the touch driving electrodes and touch sensing electrodes are increased by forming the touch driving electrode to be corresponding to the pixel electrode and forming the touch sensing electrode to be corresponding to the gate line. Furthermore, it is advantageous in that it is possible to easily manufacture a touch sensor integrated type display device having touch recognition blocks because a size of the touch recognition block is easily adjustable by using the touch driving electrode resistance reducing wires and the touch sensing electrode resistance reducing wires.

Hereinafter, a method of manufacturing the touch sensor integrated type display device according to another embodiment of this disclosure will be described with reference to FIGS. 17A to 24B.

Figure 17A:
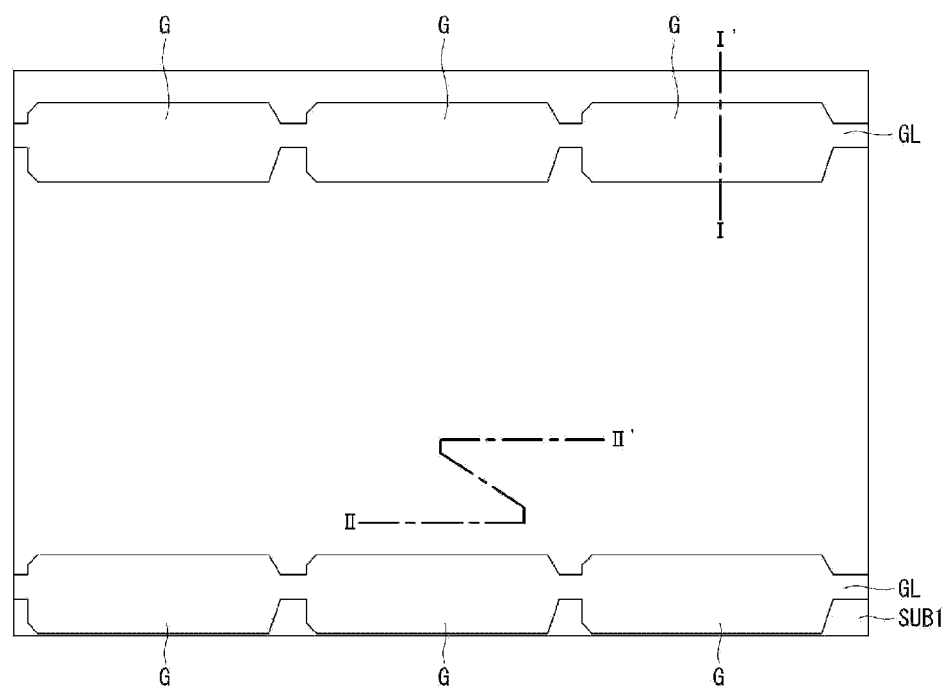
FIG. 17A is a top planar view illustrating a first mask process for manufacturing a touch sensor integrated type display device according to another embodiment of this disclosure.
Figure 17B:
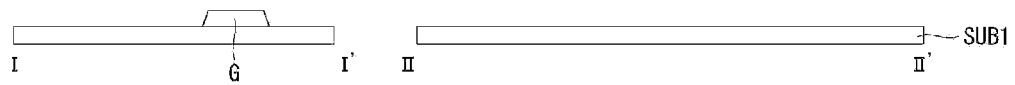
FIG. 17B is a cross-sectional view taken along lines I-I' and II-II' shown in FIG. 16A.

FIG. 17A is a top planar view illustrating a first mask process for manufacturing the touch sensor integrated type display device according to another embodiment of this disclosure, and FIG. 17B is a cross-sectional view taken along lines I-I' and II-II' shown in FIG. 17A.

Referring to FIGS. 17A and 17B, a first metal layer (gate metal layer) is entirely deposited on a first substrate SUB through a deposition process as a first conductive layer. A gate line GL and a gate electrode G extended from the gate line GL are formed on the substrate SUB1 using the first mask process.

More specifically, a gate metal layer is formed on the entire surface of the substrate SUB1 as a first conductive layer by a deposition process such as a sputtering process. After a photo resist is entirely applied to the substrate SUB 1 on which the first conductive layer is deposited, a first photo resist pattern (not shown) exposing a portion of the gate metal layer is formed through a photolithography process using a first mask. The first gate metal layer exposed via the first photo resist pattern is removed by a wet etching. The first photo resist pattern is then removed by an ashing process, thereby forming the gate line GL and the gate electrode G on the substrate SUB1. The gate metal layer may be selected from a metal material such as Al, AlNd, Cu, Cr, Mo, or MoTi.

Figure 18A:
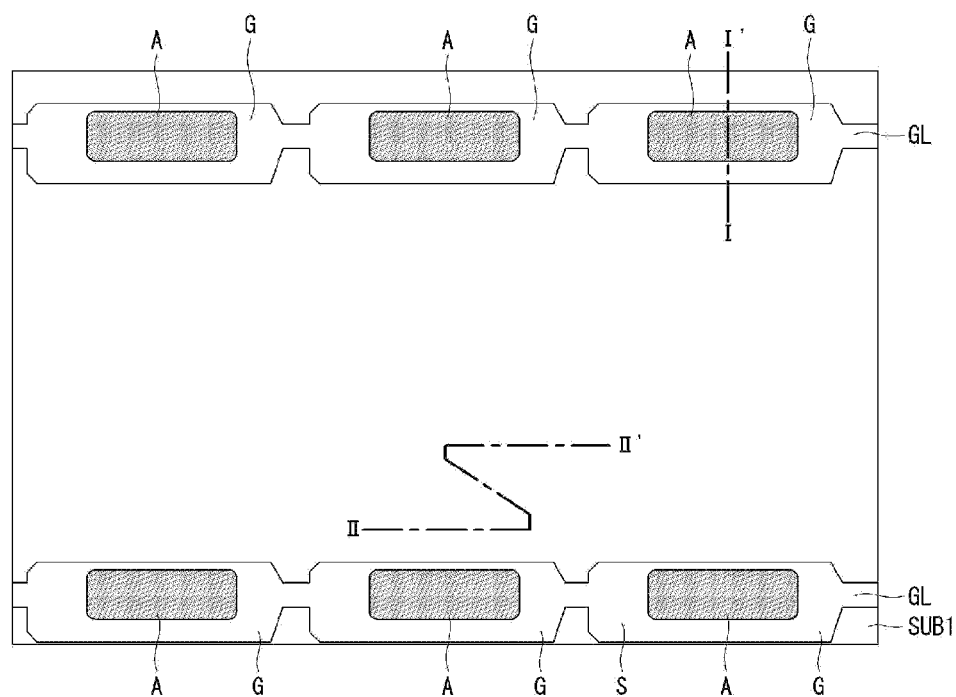
FIG. 18A is a top planar view illustrating a second mask process for manufacturing a touch sensor integrated type display device according to another embodiment of this disclosure.
Figure 18B:
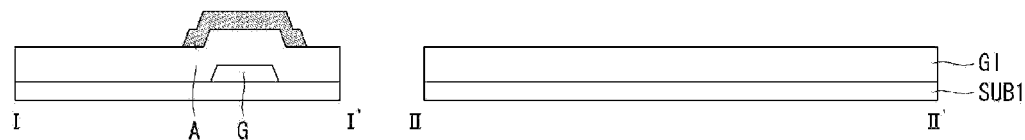
FIG. 18B is a cross-sectional view taken along lines I-I' and II-II' shown in FIG. 18A.

FIG. 18A is a top planar view illustrating a second mask process for manufacturing the touch sensor integrated type display device according to another embodiment of this disclosure, and FIG. 18B is a cross-sectional view taken along lines I-I' and II-II' shown in FIG. 18A.

Referring to FIGS. 18A and 18B, a gate insulation layer GI is formed on an entire surface of the substrate SUB1 on which the gate line GL and the gate electrode G are formed. A semiconductor layer is then entirely formed on the gate insulation layer GI. A photo resist layer is entirely formed on the semiconductor layer, and a second photo resist pattern (not shown) is formed to expose regions of the semiconductor layer excluding a channel region through a photolithography process using a second mask. The semiconductor layer exposed via the second photo resist pattern is removed by an etching process. The second photo resist pattern is then removed by an ashing process, thereby forming the semiconductor pattern A.

Figure 19A:
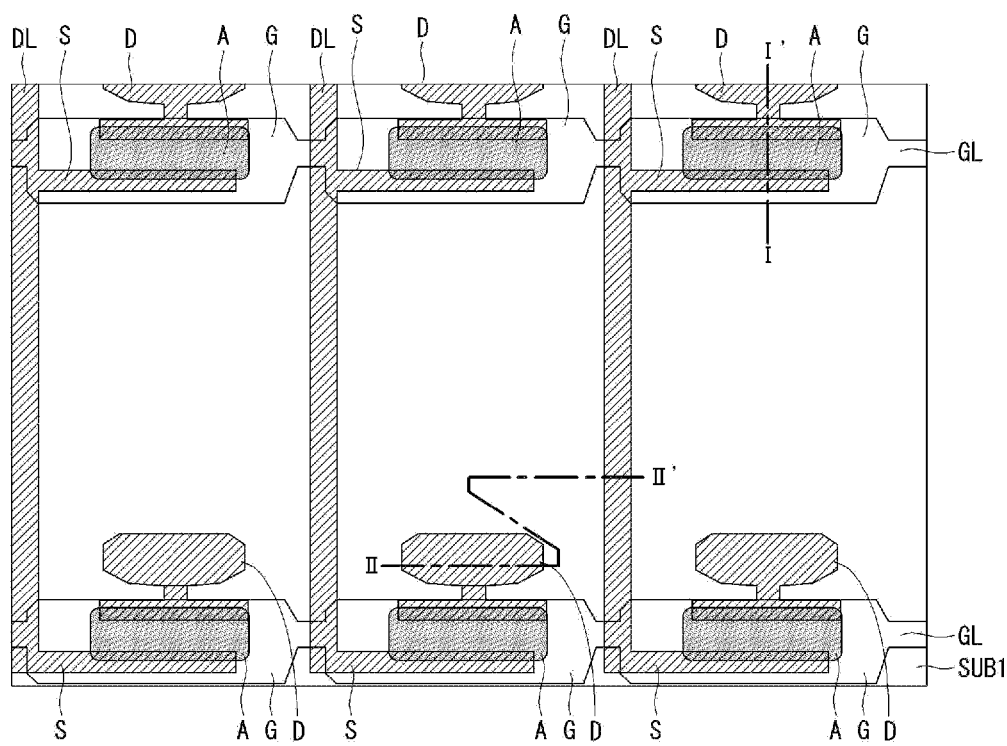
FIG. 19A is a top planar view illustrating a third mask process for manufacturing a touch sensor integrated type display device according to another embodiment of this disclosure.
Figure 19B:
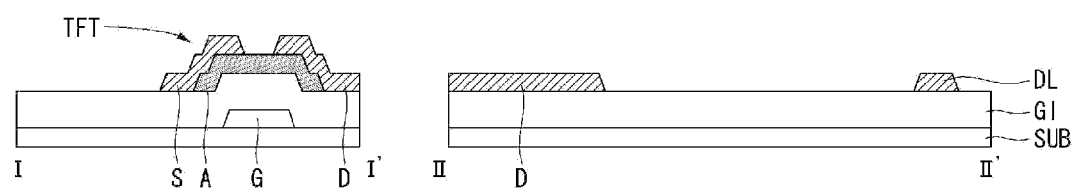
FIG. 19B is a cross-sectional view taken along lines I-I' and II-II' shown in FIG. 19A.

FIG. 19A is a top planar view illustrating a third mask process for manufacturing the touch sensor integrated type display device according to another embodiment of this disclosure, and FIG. 19B is a cross-sectional view taken along lines I-I' and II-II' shown in FIG. 19A.

Referring to FIGS. 19A and 19B, a second metal layer (data metal layer) is formed as a second conductive layer on the gate insulation layer GI on which the semiconductor pattern A is formed. And then a first conductive pattern group including a data line DL, a source electrode S extended from the data line DL, and a drain electrode D opposite to the source electrode S are formed by patterning the data metal layer through a photolithography process.

More specifically, a data metal layer is formed as a second conductive layer on the gate insulation layer GI on which the semiconductor pattern A is formed. A photo resist is entirely deposited on the data metal layer, and a third photo resist pattern (not shown) is formed through a photolithography process using a third mask. The third photo resist pattern exposes regions of the data metal layer excluding regions on which a data line, a source electrode and a drain electrode are to be formed. The data line DL and a thin film transistor TFT including the source electrode S extended from the data line DL and a drain electrode D are formed by etching the data metal layer exposed via the third photo resist pattern and removing the third photo resist pattern remained on the data metal layer. The data line DL crosses over the gate line GL with the gate insulation layer GI therebetween. The source electrode S is extended from the data line DL and the drain electrode D is opposite to the source electrode S.

Figure 20A:
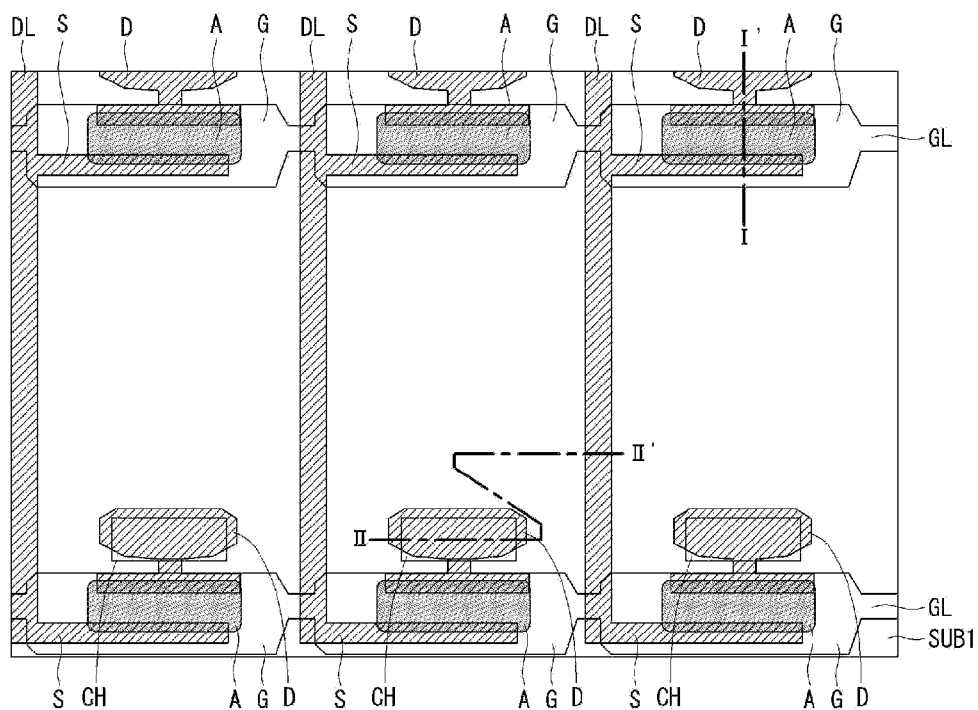
FIG. 20A is a top planar view illustrating a fourth mask process for manufacturing a touch sensor integrated type display device according to another embodiment of this disclosure.
Figure 20B:
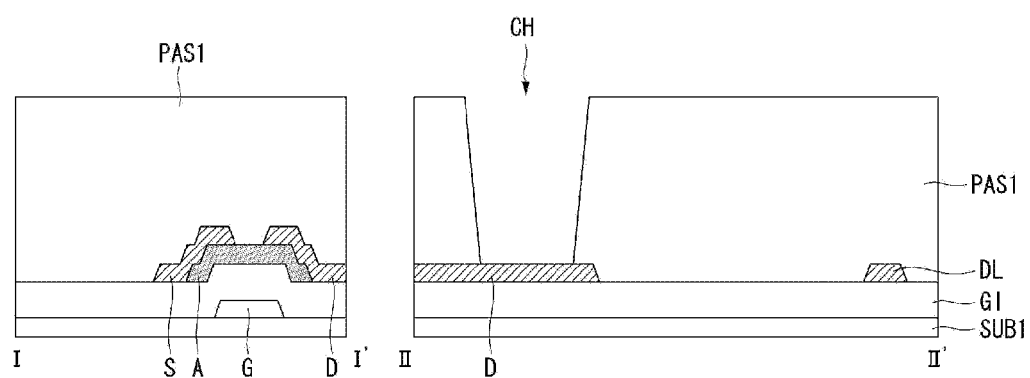
FIG. 20B is a cross-sectional view taken along lines I-I' and II-II' shown in FIG. 20A.

FIG. 20A is a top planar view illustrating a fourth mask process for manufacturing the touch sensor integrated type display device according to another embodiment of this disclosure, and FIG. 20B is a cross-sectional view taken along lines I-I' and II-II' shown in FIG. 20A.

Referring to FIGS. 20A and 20B, a first passivation layer PAS1 is entirely formed on the gate insulation layer GI on which the first conductive pattern group is formed. And then a contact hole CH is formed to expose a portion of the drain electrode D by etching the first passivation layer PAS1 using a fourth mask process.

More specifically, a first passivation layer PAS1 is entirely formed on the gate insulation layer GI on which the data line DL and the thin film transistor TFT are formed. A photo resist layer is entirely formed on the first passivation layer PAS1, and a fourth photo resist pattern (not shown) is formed to expose a portion of the drain electrode D through a photolithography process using a fourth mask. A contact hole CH exposing the portion of the drain electrode D is then formed in the first passivation layer PAS1 by etching the first passivation layer PAS1 exposed via the fourth photo resist pattern and removing the fourth photo resist pattern. The first passivation layer PAS1 may be made of a low dielectric organic material such as polyanionic cellulose (PAC).

Figure 21A:
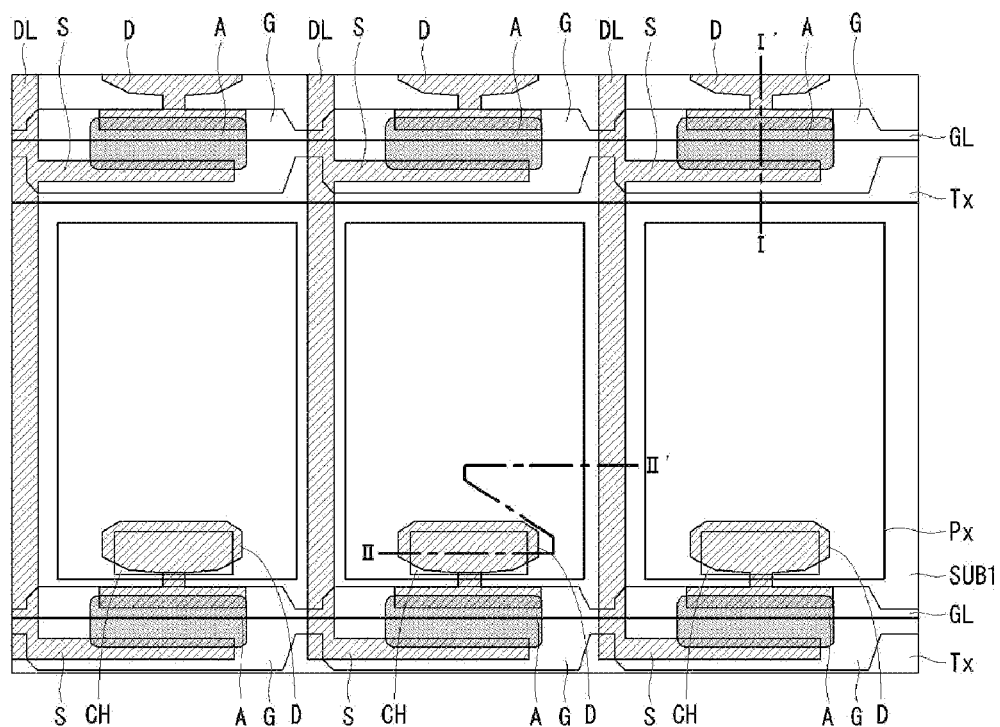
FIG. 21A is a top planar view illustrating a fifth mask process for manufacturing a touch sensor integrated type display device according to another embodiment of this disclosure.
Figure 21B:
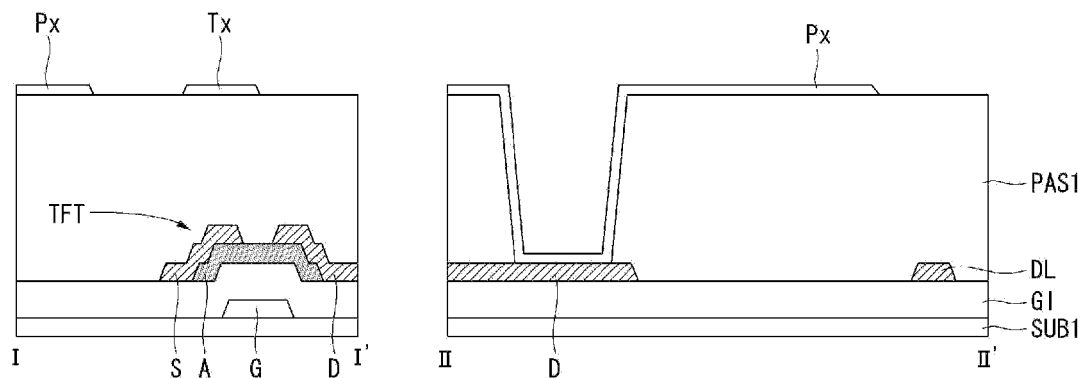
FIG. 21B is a cross-sectional view taken along lines I-I' and II-II' shown in FIG. 21A.

FIG. 21A is a top planar view illustrating a fifth mask process for manufacturing the touch sensor integrated type display device according to one embodiment of this disclosure, and FIG. 21B is a cross-sectional view taken along lines I-I' and II-II' shown in FIG. 21A.

Figure 22A:
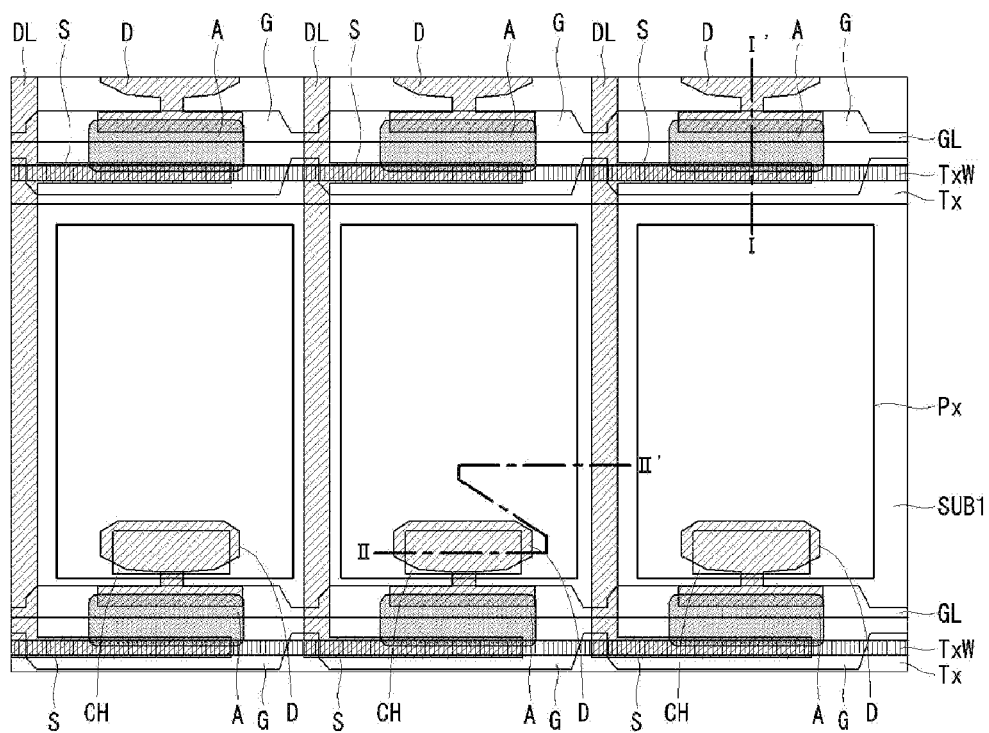
FIG. 22A is a top planar view illustrating a sixth mask process for manufacturing a touch sensor integrated type display device according to another embodiment of this disclosure.
Figure 22B:
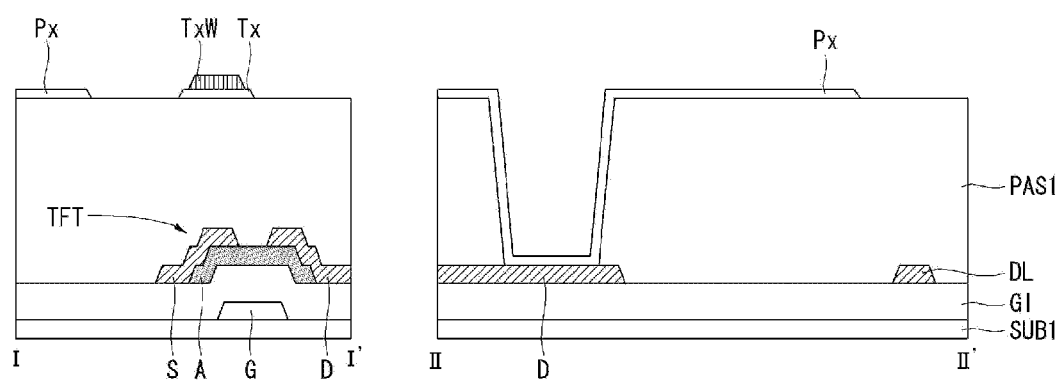
FIG. 22B is a cross-sectional view taken along lines I-I' and II-II' shown in FIG. 22A.

Referring to FIGS. 21A and 22B, a first transparent conductive layer is entirely formed as a third conductive layer on the first passivation layer PAS1 in which the contact hole CH is formed. And then pixel electrodes Px and touch driving electrodes Tx are formed by patterning the first transparent conductive layer using a fifth mask process.

More specifically, a first transparent conductive layer is entirely formed as a third conductive layer on the first passivation layer PAS1 in which the contact hole CH is formed through a deposition process such as a plasma-enhanced chemical vapor deposition (PECVD). A photo resist layer is entirely formed on the first transparent conductive layer, and a fifth photo resist pattern (not shown) is formed through a photolithography process using a fifth mask. The fifth photo resist pattern exposes regions of the first transparent conductive layer excluding regions on which pixel electrodes and touch driving electrodes are to be formed. The pixel electrodes Px and touch driving electrodes Tx are formed by etching the first transparent conductive layer exposed via the fifth photo resist pattern and removing the fifth photo resist pattern remaining on the first transparent conductive layer. The pixel electrodes Px are formed in pixel areas defined by crossings of the gate lines GL and the data lines DL, respectively. Each of the touch driving electrodes Tx is formed in parallel with the gate line GL between the pixel electrodes PX which are neighbored to each other up and down in the drawings. And the touch driving electrodes Tx and the gate lines GL are formed in one to one, otherwise one to several or one to several tens as described in relation to FIGS. 14 and 15. The first conductive layer may be made of a transparent conductive material such as indium tin oxide (ITO), indium zinc oxide (IZO), or gallium-doped zinc oxide (GZO).

FIG. 22A is a top planar view illustrating a sixth mask process for manufacturing the touch sensor integrated type display device according to another embodiment of this disclosure, and FIG. 22B is a cross-sectional view taken along lines I-I' and II-II' shown in FIG. 22A.

Referring to FIGS. 22A and 22B, a third metal layer is entirely formed as fourth conductive layer on the first passivation layer PAS1 on which the touch driving electrodes Tx and the pixel electrodes Px are formed through a deposition process such as a sputtering. And then touch driving electrode resistance reducing wires TxW are formed on the touch driving electrodes Tx in parallel with the data line DL using a sixth mask process. More specifically, through a deposition process such as a sputtering, a third metal layer is entirely formed as fourth conductive layer on the first passivation layer PAS1 on which the touch driving electrodes Tx and the pixel electrodes Px are formed. A photo resist is entirely deposited on the fourth conductive layer, and then a sixth photo resist pattern (not shown) is formed to expose portions excluding areas on which the touch driving electrodes Tx are formed through a photo-lithograph process using a sixth mask. Thereafter, the touch driving electrode resistance reducing wires TxW by etching the fourth conductive layer exposed via the sixth photo resist pattern and removing the sixth photo resist pattern remained on the fourth conductive layer. The touch driving electrode resistance reducing wires TxW are in parallel with the gate line GL and contacted with the touch driving electrodes Tx. The fourth conductive layer may be selected from a metal material such as Al, AlNd, Cu, Cr, Mo, or MoTi.

In the above description, the touch driving electrode Tx, the pixel electrodes Px and the touch driving electrode resistance reducing wires TxW are respectively formed by two mask processes. However they may be formed through a photolithography process using a halftone mask. That is, provided that the process using the halftone mask is used, the touch driving electrodes Tx, the pixel electrodes Px and the touch driving electrode resistance reducing wires TxW may be formed with one mask process. The description about the process using the halftone mask is omitted because it is known as the related art.

Figure 23A:
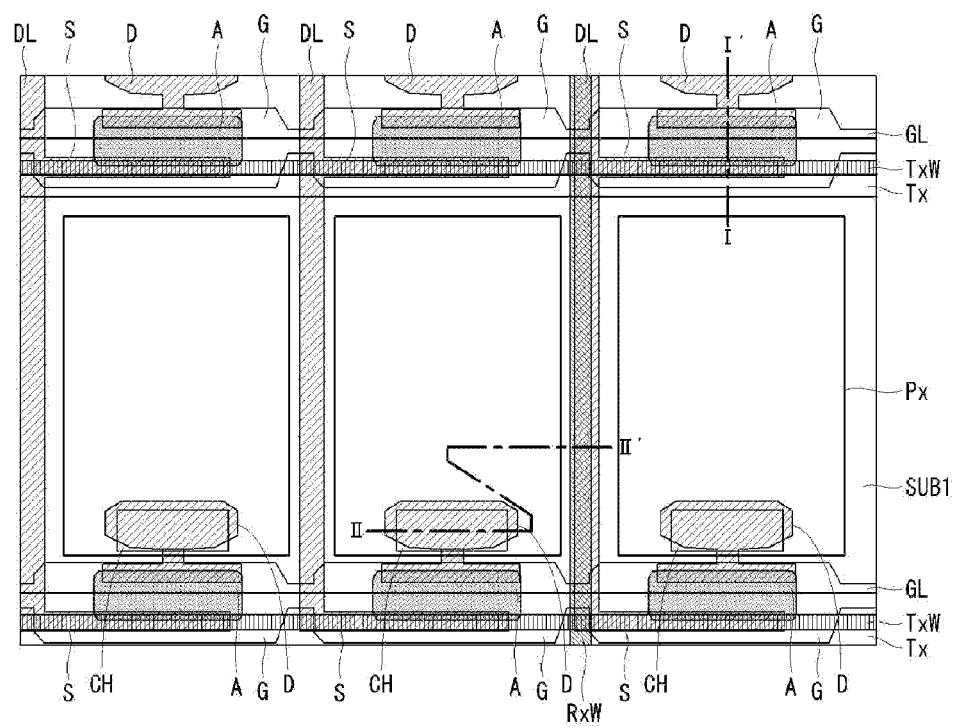
FIG. 23A is a top planar view illustrating a seventh mask process for manufacturing a touch sensor integrated type display device according to another embodiment of this disclosure.
Figure 23B:
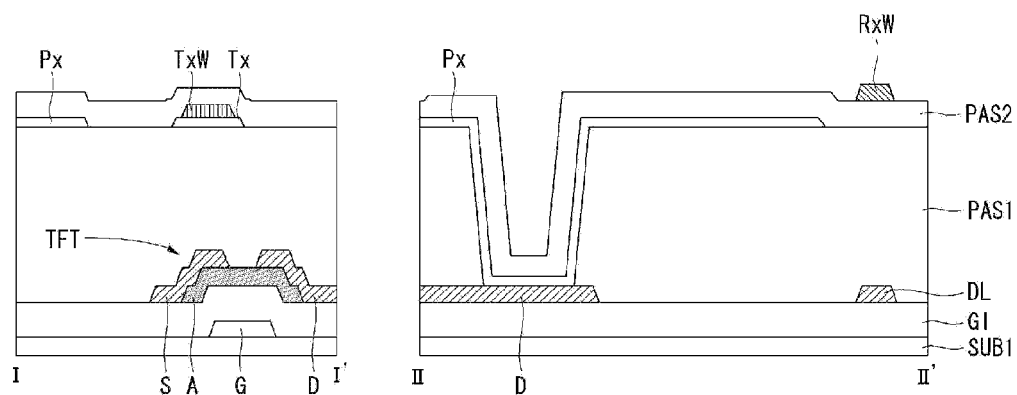
FIG. 23B is a cross-sectional view taken along lines I-I' and II-II' shown in FIG. 23A.

FIG. 23A is a top planar view illustrating a seventh mask process for manufacturing the touch sensor integrated type display device according to another embodiment of this disclosure, and FIG. 23B is a cross-sectional view taken along lines I-I' and II-II' shown in FIG. 23A.

Referring to FIGS. 23A and 23B, a second passivation layer PAS2 and a fourth metal layer are sequentially are formed on the first passivation layer PAS1 on which the touch driving electrodes Tx, the pixel electrodes Px and the touch driving electrode resistance reducing wires TxW are formed. And then touch sensing electrode resistance reducing wires RxW are formed on the second passivation layer to be in parallel with the data line DL by patterning the fifth conductive layer using a seventh mask process.

More specifically, a second passivation layer PAS2 is entirely formed on the first passivation layer PAS1 on which the touch driving electrodes Tx, the pixel electrodes Px and the touch driving electrode resistance reducing wires TxW are formed are formed, and then a fourth metal layer is deposited on the second passivation layer PAS2 as a fifth conductive layer through a deposition process such as a plasma-enhanced chemical vapor deposition (PECVD). A photo resist is entirely formed on the fifth conductive layer PAS2, and then a seventh photo resist pattern (not shown) is formed to expose area excluding areas where sensing electrode resistance reducing wires are to be formed. The sensing electrode resistance reducing wires RxW are formed by etching the fifth conductive layer exposed via the seventh photo resist pattern and removing the photo resist pattern remained on the fifth conductive layer. The second passivation layer PAS2 may be made of a low dielectric organic material such as polyanionic cellulose (PAC), and the fifth conductive layer may be selected from a metal material such as Al, AlNd, Cu, Cr, Mo or MoTi.

Figure 24A:
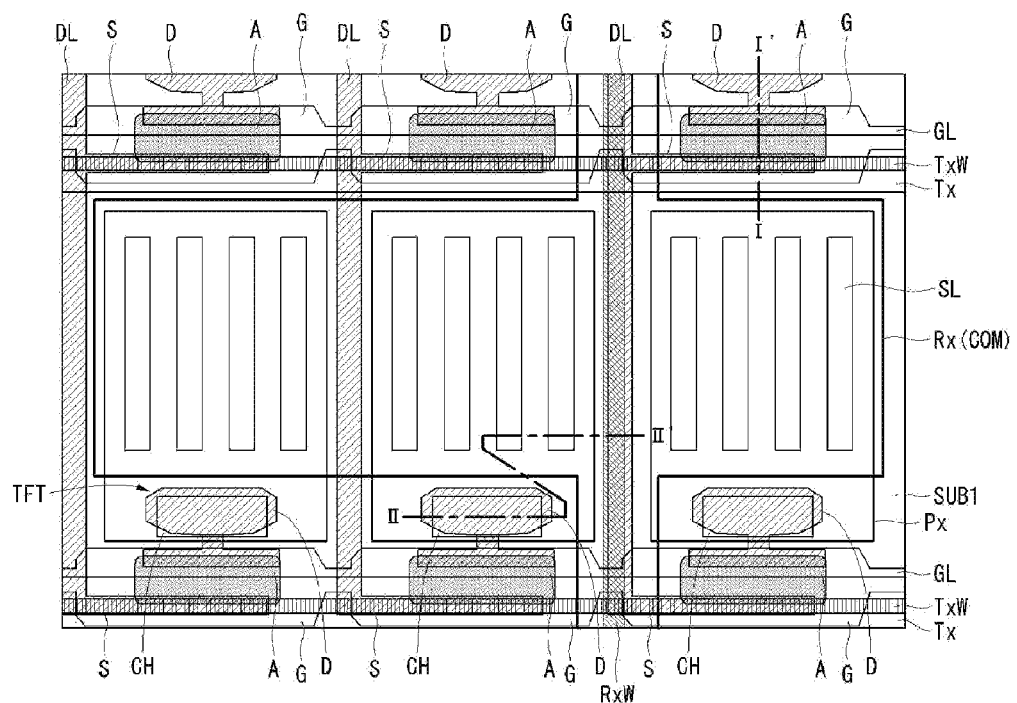
FIG. 24A is a top planar view illustrating a eighth mask process for manufacturing a touch sensor integrated type display device according to another embodiment of this disclosure.
Figure 24B:
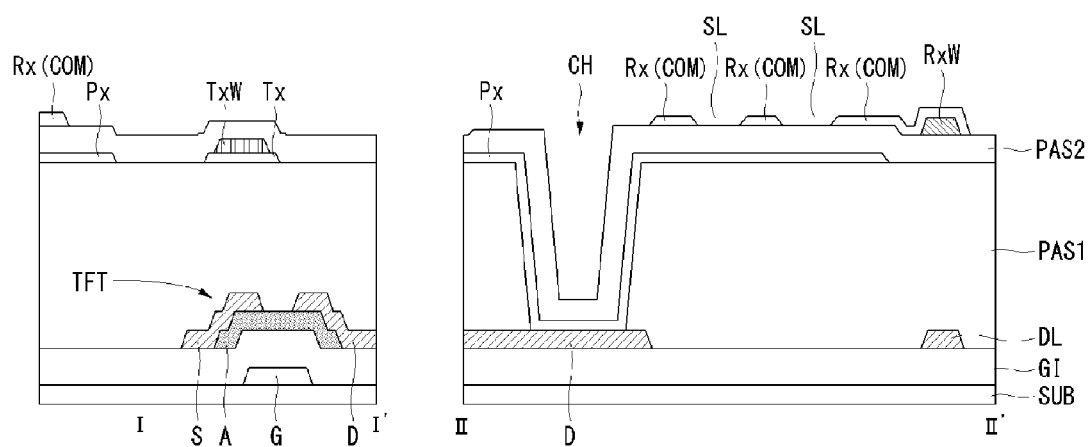
FIG. 24B is a cross-sectional view taken along lines I-I' and II-II' shown in FIG. 24A.

FIG. 24A is a top planar view illustrating a eighth mask process for manufacturing the touch sensor integrated type display device according to another embodiment of this disclosure, and FIG. 24B is a cross-sectional view taken along lines I-I' and II-II' shown in FIG. 24A.

Referring to FIGS. 24A and 24B, a second transparent conductive layer as sixth conductive layer is deposited on the second passivation layer PAS2 on which the sensing electrode resistance reducing wires RxW are formed. And then touch sensing electrodes Rx which serve as common electrodes COM are formed by etching the sixth conductive layer through an eighth mask process.

More specifically, second transparent conductive layer as sixth conductive layer is deposited on the second passivation layer PAS2 on which the sensing electrode resistance reducing wires RxW are formed. A photo resist is entirely formed on the sixth conductive layer, and an eighth photo resist pattern (not shown) is formed to expose portions excluding areas where sensing electrode resistance reducing wire RxW are to be formed through a photolithography process using an eighth mask. The sixth conductive layer exposed via the eighth photo resist pattern is etched, and then sensing electrode resistance reducing wires RxW are formed by removing the eighth photo resist pattern. The sixth conductive layer may be selected from a transparent conductive material such as ITO, IZO, or GZO.

In the description for the seventh and eighth mask processes, the sensing electrode resistance reducing wire RxW and the touch sensing electrodes Rx are formed by respective mask process. However the sensing electrode resistance reducing wire RxW and the touch sensing electrodes Rx may be formed through a photolithography process using a halftone mask. Provided that the process using the halftone mask is used, the sensing electrode resistance reducing wire RxW, the sensing electrode resistance reducing wire RxW and the touch sensing electrodes Rx may be formed with one mask process. The description about the process using the halftone mask is omitted because it is known as the related art.

According to the above-mentioned touch sensor integrated type display devices and methods of manufacturing the same, it may be unnecessary to independently form the touch sensing electrodes (or touch driving electrodes) for touch driving operation because the common electrode for driving the display device can serve as touch sensing electrodes (or touch driving electrodes). Accordingly, it is possible to remove the process for forming the independent touch sensing electrodes (or touch driving electrodes), thereby lessening a thickness of the display device by as much as the thickness of the touch sensing electrode.

Furthermore, one touch sensing electrode (or one touch driving electrode) and one pixel electrode may be formed in one to one, otherwise one to n (wherein, n is two or more natural number). Also, the touch sensing and driving electrodes may be easily grouped using the sensing and driving electrode resistance reducing wires. Accordingly, it is possible to easily adjust a size of touch recognition block according to need, and improve touch sensitivity by increasing mutual capacitance between the touch driving electrodes and touch sensing electrodes because number of the touch driving electrodes and touch sensing electrodes are increased.

While this disclosure has been described with respect to a limited number of embodiments, those skilled in the art, having benefit of the above description, will appreciate that other embodiments can be devised which do not depart from the scope of this disclosure as disclosed herein. For example, in embodiments according to this disclosure, it is described that the touch driving electrode includes a driving electrode resistance reducing wire and the touch sensing electrode includes a sensing electrode resistance reducing wire. However, the touch driving and sensing electrodes need the resistance reducing wires in case that they are made of transparent conductive material such as ITO, IZO or GZO. On the other hand the touch driving and sensing electrodes no need the resistance reducing wires in this case the touch driving and sensing electrodes are connected to the routing wires. Accordingly, the scope of this disclosure should be limited only by the attached claims.

What is claimed is:

1. A touch sensor integrated type display device comprising:
    a plurality of gate lines;
    a plurality of data lines crossing over the plurality of the gate lines;
    a plurality of pixel electrodes disposed in areas defined by crossing over the gate lines and the data lines;
    a plurality of first electrodes, each first electrode being disposed between pixel electrodes which are neighbored to each other with a gate line therebetween without overlapping any one of the plurality of pixel electrodes, the plurality of first electrodes serving as one of touch driving electrodes and touch sensing electrodes during a touch operation; and
    a plurality of second electrodes, each of the second electrodes disposed to overlap with at least one portion of the pixel electrode and arranged in parallel with the gate line, wherein during the touch operation, the plurality of second electrodes serve as the touch sensing electrodes when the plurality of first electrodes serve as the touch driving electrodes, and serve as the touch driving electrodes when the plurality of first electrodes serve as the touch sensing electrodes,
    wherein during the touch operation, a touch is detected by a change in capacitance between the first electrodes and the second electrodes.

2. The touch sensor integrated type display device of claim 1, wherein the first plurality of electrodes are the touch sensing electrodes.

3. The touch sensor integrated type display device of claim 1, wherein the first plurality of electrodes are the touch driving electrodes.

4. The touch sensor integrated type display device of claim 1, further comprising at least one first electrode resistance reducing wire disposed on the corresponding one of the first electrodes to reduce resistance of the corresponding first electrode.

5. The touch sensor integrated type display device of claim 1, further comprising:
    a gate insulation layer between the gate lines and the data lines to cover the gate lines;
    a plurality of thin film transistors disposed in pixel areas defined by crossings of the gate lines and the data lines;
    a first passivation layer covering the gate insulation layer on which the thin film transistors are disposed;
    a second passivation layer covering the first electrodes which are disposed on the first passivation layer to be in parallel with the data lines and disposed in at least two pixel area neighbored to each other with a gate line therebetween; and
    a plurality of pixel electrodes disposed on the second passivation layer in the pixel areas, respectively, each of the pixel electrodes being overlapped with at least one portion of the first electrode; and
    wherein the second electrodes are disposed on the second passivation layer between the pixel electrodes which are neighbored to each other with the gate line therebetween, and disposed in parallel with the gate line.

6. The touch sensor integrated type display device of claim 5, wherein the first plurality of electrodes are the touch driving electrodes, and the second plurality of electrodes are the touch sensing electrodes.

7. The touch sensor integrated type display device of claim 5, wherein the first plurality of electrodes are the touch sensing electrodes, and the second plurality of electrodes are the touch driving electrodes.

8. The touch sensor integrated type display device of claim 5, further comprising at least one second electrode resistance reducing wire disposed directly on the each of the second electrodes, thereby reducing resistance of the second electrode.

9. The touch sensor integrated type display device of claim 1, further comprising:
- a gate insulation layer between the data lines to cover the gate lines;
- a plurality of thin film transistors disposed in pixel areas defined by crossings of the gate lines and the data lines, respectively;
- a first passivation layer covering the gate insulation layer on which the thin film transistors are disposed;
- a plurality of pixel electrodes disposed on the first passivation layer in the pixel areas, respectively; and
- a second passivation layer covering the plurality of first electrodes which are disposed on the first passivation layer to be in parallel with the gate lines between the pixel electrodes neighbored to each other with a gate line therebetween,
- wherein the plurality of second electrodes are disposed on the second passivation layer in at least two pixel areas with a gate line therebetween, a portion of each second electrode being overlapped with the pixel electrode to be in parallel with the data line.

10. The touch sensor integrated type display device of claim 9, wherein the first plurality of electrodes are the touch sensing electrodes.

11. The touch sensor integrated type display device of claim 9, wherein the first plurality of electrodes are the touch driving electrodes.

12. The touch sensor integrated type display device of claim 9, further comprising at least one first electrode resistance reducing wire disposed on the each of the first electrodes, thereby reducing resistance of the first electrode.

13. The touch sensor integrated type display device of claim 1, further comprising:
- first electrode resistance reducing wires, each formed directly on a corresponding one of the first electrodes, at least two of the first electrode resistance reducing wires being connected to each other to connect the corresponding first electrodes to each other into a group,
- wherein the display device drives the touch driving electrodes with a touch driving voltage from a power supply during the touch operation.

14. The touch sensor integrated type display device of claim 1, wherein during the touch operation, the touch is detected by a change in the capacitance directly between the first electrodes and the second electrodes.

15. The touch sensor integrated type display device of claim 1, wherein during the touch operation, an electric field for detecting the touch is generated directly between the first electrodes and second electrodes.

16. The touch sensor integrated type display device of claim 13, wherein the plurality of first electrodes are separated into a plurality of groups, the first electrodes of each of the plurality of groups being connected together by the connection of their corresponding first electrode resistance reducing wires, each of the groups including multiple rows of the first electrodes and being separately driven or sensed during the touch operation.

17. The touch sensor integrated type display device of claim 1, wherein:
- the plurality of first electrodes and the plurality of second electrodes define a touch area of the display device;
- each of the plurality of first electrodes spans an entire width of the touch area in a direction of the gate lines; and
- each of the plurality of second electrodes spans an entire width of the touch area in a direction of the data lines.

* * * * *